United States Patent
Chen et al.

(10) Patent No.: US 9,488,808 B1
(45) Date of Patent: Nov. 8, 2016

(54) IMAGE CAPTURING LENS SYSTEM, IMAGE CAPTURING APPARATUS AND ELECTRONIC DEVICE

(71) Applicant: LARGAN PRECISION CO., LTD., Taichung (TW)

(72) Inventors: Chun-Yen Chen, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/869,174

(22) Filed: Sep. 29, 2015

(30) Foreign Application Priority Data

Jul. 3, 2015 (TW) ............... 104121621 A

(51) Int. Cl.
  G02B 9/62 (2006.01)
  G02B 13/00 (2006.01)
  G02B 1/04 (2006.01)
  G02B 27/00 (2006.01)

(52) U.S. Cl.
  CPC ........... *G02B 13/0045* (2013.01); *G02B 1/041* (2013.01); *G02B 9/62* (2013.01); *G02B 27/0025* (2013.01)

(58) Field of Classification Search
  CPC .... G02B 13/0045; G02B 9/62; G02B 1/041; G02B 27/0025
  See application file for complete search history.

(56) References Cited

U.S. PATENT DOCUMENTS

| 4,429,958 A | 2/1984 | Yamaguchi |
| 4,568,151 A | 2/1986 | Mihara |
| 4,753,523 A | 6/1988 | Hirose |
| 4,900,141 A | 2/1990 | Ohshita |
| 5,349,474 A | 9/1994 | Shimizu et al. |
| 8,379,323 B2 | 2/2013 | Huang et al. |
| 8,520,320 B1 | 8/2013 | Huang |
| 2014/0218582 A1 | 8/2014 | Chen et al. |
| 2015/0042862 A1 | 2/2015 | Huang |
| 2015/0247989 A1 | 9/2015 | Sakai |
| 2015/0248016 A1* | 9/2015 | Sakai .................. G02B 27/646 359/557 |

\* cited by examiner

*Primary Examiner* — Joseph P Martinez
(74) *Attorney, Agent, or Firm* — Locke Lord LLP; Tim Tingkang Xia, Esq.

(57) ABSTRACT

An image capturing lens system includes, in order from an object side to an image side: a first lens element with positive refractive power having a convex object-side surface; a second lens element with negative refractive power; a third lens element having an object-side surface and an image-side surface which are both aspheric; a fourth lens element with negative refractive power having an object-side surface and an image-side surface which are both aspheric; a fifth lens element having an object-side surface and an image-side surface which are both aspheric; and a sixth lens element having a concave object-side surface and a convex image-side surface which are both aspheric. With such arrangements, the convergent capability is mainly contributed from the object side of the lens assembly for higher portability of the lens system. Additionally, the peripheral image curve can be prevented while correcting the chromatic aberration and the peripheral image focus.

27 Claims, 21 Drawing Sheets

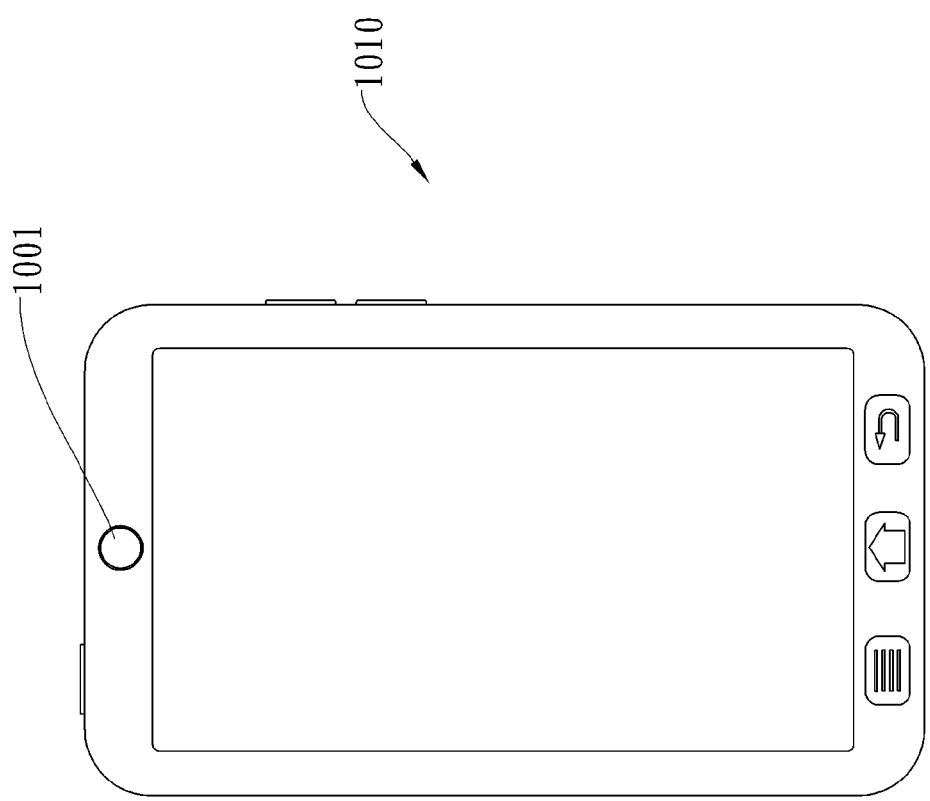

IMAGE CAPTURING LENS SYSTEM, IMAGE CAPTURING APPARATUS AND ELECTRONIC DEVICE

RELATED APPLICATIONS

This application claims priority to Taiwan Application Serial Number 104121621, filed on Jul. 3, 2015, which is incorporated by reference herein in its entirety.

BACKGROUND

Technical Field

The present disclosure relates to an image capturing lens system and an image capturing apparatus, and more particularly, to an image capturing lens system and an image capturing apparatus applicable to electronic devices.

Description of Related Art

As personal electronic products nowadays are becoming more and more compact, the internal components of the electronic products are also required to be smaller than before, resulting in an increasing demand for compact image capturing lens systems. In addition to the demand of miniaturization, the reduction of the pixel size of image sensors in the advanced semiconductor manufacturing technologies has enabled imaging lenses to evolve toward the field of higher megapixels. Meanwhile, the popularity of smart phones and tablet personal computers boost the need for compact image capturing lens systems featuring high image quality.

Currently, most conventional lens assemblies equipped in portable electronic products have been developed for close-distance and wide field of view photography. However, the optical design of such lens assemblies cannot satisfy the need for capturing fine-detail images at long distances. A conventional telephoto optical system generally adopts a multi-element structure and comprises glass lens elements with spherical surfaces. Such a configuration not only results in a bulky lens assembly with low portability, but the high price of the product has deterred large numbers of consumers. Therefore, conventional optical systems can no longer meet consumers' needs for convenience and multiple photographing functions.

Therefore, a need exists in the art for an image capturing lens system that features a compact design and high image quality.

SUMMARY

According to one aspect of the present disclosure, an image capturing lens system includes, in order from an object side to an image side: a first lens element with positive refractive power having a convex object-side surface; a second lens element with negative refractive power; a third lens element having an object-side surface and an image-side surface which are both aspheric; a fourth lens element with negative refractive power having an object-side surface and an image-side surface which are both aspheric; a fifth lens element having an object-side surface and an image-side surface which are both aspheric; and a sixth lens element having a concave object-side surface and a convex image-side surface which are both aspheric; wherein the image capturing lens system has a total of six lens elements and an axial air gap is arranged between every two adjacent lens elements of the first lens element, the second lens element, the third lens element, the fourth lens element, the fifth lens element and the sixth lens element; wherein an axial distance between the fifth lens element and the sixth lens element is T56, a sum of axial air gaps between every two adjacent lens elements is $\Sigma AT$, a focal length of the fourth lens element is f4, a focal length of the third lens element is f3, a focal length of the image capturing lens system is f, a curvature radius of the object-side surface of the first lens element is R1, an axial distance between the image-side surface of the sixth lens element and an image surface is BL, an axial distance between the object-side surface of the first lens element and the image-side surface of the sixth lens element is TD, a central thickness of the fourth lens element is CT4, a central thickness of the fifth lens element is CT5, and the following conditions are satisfied:

$0.30 < T56/(\Sigma AT - T56)$;

$-4.0 < f4/|f3| < 0$;

$3.30 < f/R1 < 9.50$;

$0 < BL/TD < 0.70$; and $CT4/CT5 < 3.0$.

According to another aspect of the present disclosure, an image capturing apparatus includes the aforementioned image capturing lens system and an image sensor.

According to yet another aspect of the present disclosure, an electronic device includes the aforementioned image capturing apparatus.

The first lens element has positive refractive power so that the convergent capability is mainly contributed from the object side of the lens assembly, thereby the lens system's size can be effectively controlled to increase the portability. The second lens element has negative refractive power so as to correct the chromatic aberration of the lens system. When the fourth lens element is a negative lens element, the curving of a peripheral image can be prevented while a peripheral focus position of an image is corrected. When the object-side surface of the sixth lens element is concave, the incident angle of the light is more appropriate, thereby images are free from stray light generated due to a total reflection caused by an excessively large incident angle. When the image-side surface of the sixth lens element is convex, it is favorable for correcting the peripheral aberration of the lens system, thereby obtaining better image quality.

When $T56/(\Sigma AT - T56)$ satisfies the above condition, the lens system will have sufficient space so as to prevent the interference between the fifth lens element and the sixth lens element, and it is favorable for the assembling of the lens assembly.

When $f4/|f3|$ satisfies the above condition, the middle section of the lens system has sufficient light dispersion control functionalities so as to balance the aberration of the system.

When f/R1 satisfies the above condition, the refractive power of the first lens element can be enhanced so that the lens system is adaptable to diverse configurations and applications.

When BL/TD satisfies the above condition, the back focal length of the image capturing lens system can be favorably controlled to improve the space utilization efficiency, thereby obtaining a compact image capturing lens system.

BRIEF DESCRIPTION OF THE DRAWINGS

FIG. 10A shows a smart phone with an image capturing apparatus of the present disclosure installed therein;

DETAILED DESCRIPTION

Figure 1A:
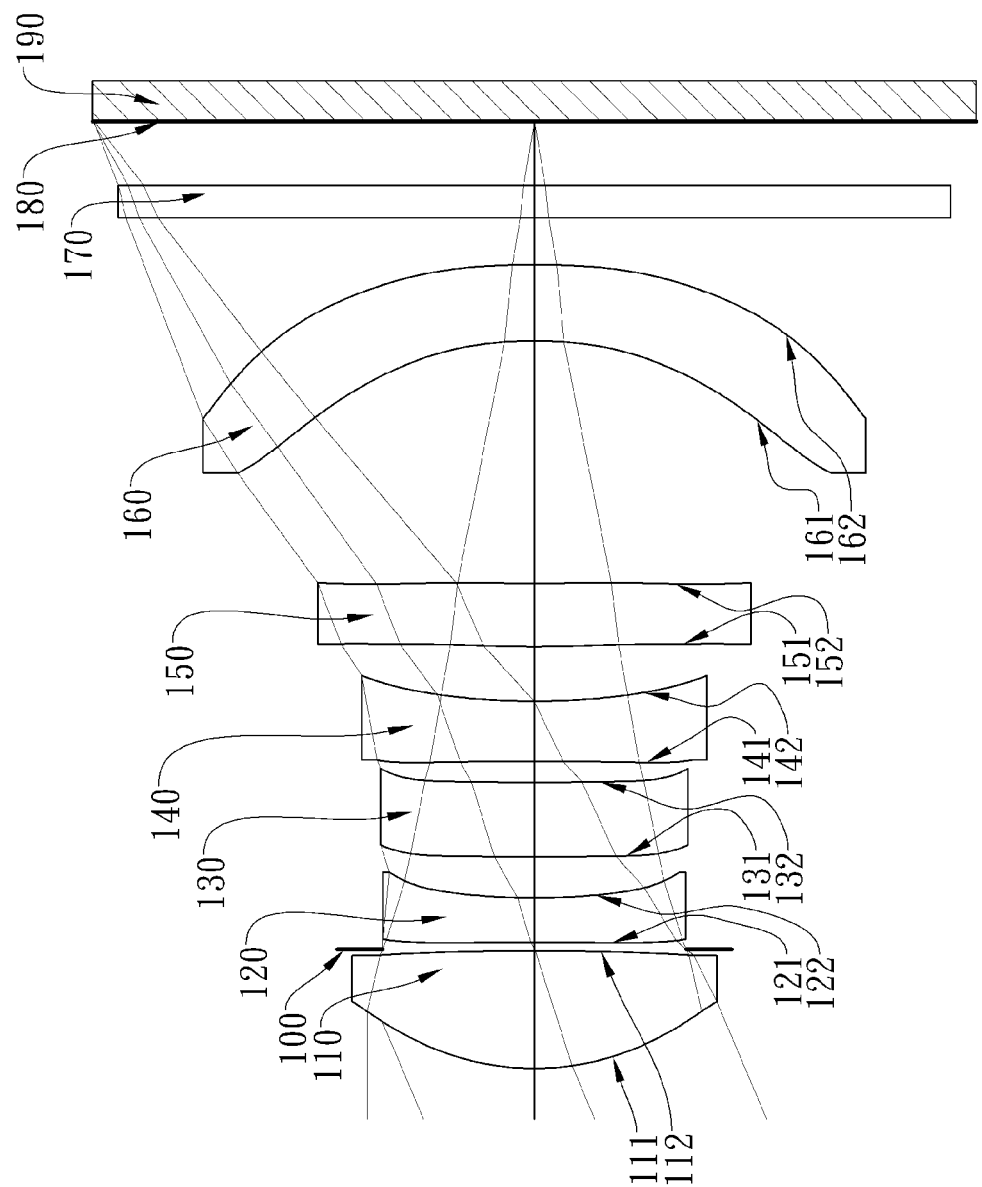
FIG. 1A is a schematic view of an image capturing apparatus according to the 1st embodiment of the present disclosure.

The present disclosure provides an image capturing lens system including, in order from an object side to an image side, a first lens element, a second lens element, a third lens element, a fourth lens element, a fifth lens element, and a sixth lens element, wherein the image capturing lens system has a total of six lens elements. The image capturing lens system is further provided with a stop.

In the aforementioned image capturing lens system, every two adjacent lens elements of the first lens element, the second lens element, the third lens element, the fourth lens element, the fifth lens element and the sixth lens element have an axial air gap in between. That is, the image capturing lens system has six non-cemented lens elements. Moreover, the manufacturing process of the cemented lens elements is more complex than that of the non-cemented lens elements. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the image capturing lens system. Therefore, every two adjacent lens elements among the six lens elements of the image capturing lens system of the present disclosure have an air gap in between so as to effectively avoid the problem generated by the cemented lens elements.

The first lens element has positive refractive power so that the convergent capability is mainly contributed from the object side of the lens system, thereby the lens system's size can be effectively controlled to increase the portability. The object-side surface of the first lens element is convex in a paraxial region thereof so as to adjust the distribution of the positive refractive power and thereby to enhance the miniaturization of the lens system.

The second lens element has negative refractive power so as to correct the chromatic aberration of the lens system.

The third lens element may have positive refractive power, so that the distribution of the positive refractive power of the lens system can be effectively balanced.

The fourth lens element has negative refractive power, so that the curving of a peripheral image can be prevented while the peripheral focus position of an image is corrected. The object-side surface of the fourth lens element may be concave in a paraxial region thereof and the image-side surface of the fourth lens element may be concave in a paraxial region thereof so as to favorably correct the aberration of the image capturing lens system.

The fifth lens element may have positive refractive power, so that it is favorable for reducing the spherical aberration and astigmatism near the object side and balancing the distribution of the positive refractive power. The object-side surface of the fifth lens element may be convex in a paraxial region thereof, so that the distortion of the peripheral light and the high order aberration of the image capturing lens system can be effectively corrected, thereby increasing the resolution.

The six lens element may have negative refractive power; this allows the principal point of the image capturing lens system to be placed away from the image surface, thereby favorably reducing the total track length of the image capturing lens system to keep the image capturing lens system compact. When the object-side surface of the sixth lens element is concave, the incident angle of the light is more appropriate, thereby images are free from stray light generated due to a total reflection caused by an excessively large incident angle. When the image-side surface of the sixth lens element is convex, it is favorable for correcting the peripheral aberration of the lens system, thereby obtaining better image quality.

When an axial distance between the fifth lens element and the sixth lens element is T56, a sum of axial air gaps between every two adjacent lens elements is $\Sigma AT$, and the following condition is satisfied: $0.30<T56/(\Sigma AT-T56)$, the lens system will have sufficient space so as to prevent the interference between the fifth lens element and the sixth lens element, and it is favorable for the assembly of the lens assembly. Preferably, the following condition is satisfied: $0.85<T56/(\Sigma AT-T56)$.

When a focal length of the fourth lens element is f4, a focal length of the third lens element is f3, and the following condition is satisfied: $-4.0<f4/|f3|<0$, the middle section of the lens system has sufficient light dispersion control functionalities so as to balance the aberration of the lens system. Preferably, the following condition is satisfied: $-1.5<f4/|f3|<0$. More preferably, the following condition is satisfied: $-0.65<f4/|f3|<0$.

When the focal length of the image capturing lens system is f, a curvature radius of the object-side surface of the first lens element is R1, and the following condition is satisfied: $3.30<f/R1<9.50$, the refractive power of the first lens element can be enhanced so that the lens system is adaptable to diverse configurations and applications.

When an axial distance between the image-side surface of the sixth lens element and an image surface is BL, an axial distance between the object-side surface of the first lens element and the image-side surface of the sixth lens element is TD, and the following condition is satisfied: $0<BL/TD<0.70$, the back focal length of the image capturing lens system can be favorably controlled to improve the space utilization efficiency so as to keep the image capturing lens system compact. Preferably, the following condition is satisfied: $0<BL/TD<0.30$.

When a central thickness of the fourth lens element is CT4, a central thickness of the fifth lens element is CT5, and the following condition is satisfied: $CT4/CT5<3.0$, it is favorable for molding and manufacturing the lens elements so that the image capturing lens system has good image quality. Preferably, the following condition is satisfied: $CT4/CT5<1.7$.

When a maximum refractive index among the refractive indices of the first lens element, the second lens element, the third lens element, the fourth lens element, the fifth lens element, and the sixth lens element is Nmax, and the following condition is satisfied: $Nmax<1.70$, it is favorable for arranging suitable materials for lens elements and for increasing the flexibility in design.

At least one of the first lens element, the second lens element, the third lens element, the fourth lens element, the fifth lens element and the sixth lens element has at least one inflection point, so that it is favorable for correcting the system aberration of the peripheral image.

When an axial distance between the stop and the image-side surface of the sixth lens element is SD, the axial distance between the object-side surface of the first lens element and the image-side surface of the sixth lens element is TD, and the following condition is satisfied: $0.7<SD/TD<1.10$, it is favorable for balancing the total track length of the image capturing lens system while controlling the incident angle so as to prevent the image capturing lens system from being too bulky.

When a focal length of the first lens element is f1, a focal length of the second lens element is f2, the focal length of the fourth lens element is f4, a focal length of the sixth lens element is f6, the focal length of the third lens element is f3, a focal length of the fifth lens element is f5, and the following conditions are satisfied: $|f1|<|f2|<|f4|<|f3|$, $|f1|<|f2|<|f4|<|f5|$, $|f1|<|f2|<|f6|<|f3|$, $|f1|<|f2|<|f6|<|f5|$, the distribution of the refractive power of the image capturing lens system is more balanced so as to meet different photographic needs.

When a curvature radius of an image-side surface of the second lens element is R4, a curvature radius of an object-side surface of the second lens element is R3, and preferably the following condition is satisfied: $-0.20<R4/R3<0.40$, the high order aberration of the image capturing lens system can be favorably corrected to improve the image quality, and the back focal length of the image capturing lens system can be effectively suppressed to effectively utilize the space so that the lens elements of the image capturing lens system can be more tightly assembled.

When the focal length of the image capturing lens system is f, a curvature radius of the object-side surface of the sixth lens element is R11, a curvature radius of the image-side surface of the sixth lens element is R12, and the following condition is satisfied: $-8.0<(f/R11)+(f/R12)<-1.5$, the refraction angle of the light exiting the image capturing lens system can be effectively controlled, and it is favorable for correcting the aberration of the peripheral image and for reducing the back focal length so as to reduce the lens assembly's size. Preferably, the following condition is satisfied: $-8.0<(f/R11)+(f/R12)<-2.5$.

When an Abbe number of the second lens element is V2, an Abbe number of the third lens element is V3, an Abbe number of the fifth lens element is V5, an Abbe number of the fourth lens element is V4, and the following condition is satisfied: $0.70<(V2+V3+V5)/V4<1.50$, the dispersion capability of the image capturing lens system can be enhanced to compensate for the discrepancy in the capability of converging different wavelengths of lights.

When a distance in parallel with an optical axis from an axial vertex on the image-side surface of the sixth lens element to a maximum effective radius position on the image-side surface of the sixth lens element is SAG62 (SAG62 is defined as a negative value if the aforementioned distance is measured in a direction towards the object side, and SAG62 is defined as a positive value if the aforementioned distance is measured in a direction towards the image side), a central thickness of the sixth lens element is CT6, and preferably the following condition is satisfied: $SAG62/CT6<-1.7$, the sixth lens element will not be too curved and the thickness thereof is proper, and it is favorable not only for manufacturing and molding the lens elements but also for reducing the space required for assembling the lens elements, thereby the lens elements can be assembled more tightly.

When an Abbe number of at least one of the lens elements with positive refractive power is less than 28.0, the discrepancy in the capability of converging different wavelengths of lights can be balanced, and it is more suitable for photographing distant subjects.

When half of a maximal field of view of the image capturing lens system is HFOV, and the following condition is satisfied: $\tan(2*HFOV)<1.20$, it is favorable for providing a satisfactory telephoto function while effectively controlling the image range, thereby meeting the need for telephoto photographing.

When an axial distance between the third lens element and the fourth lens element is T34, an axial distance between the fourth lens element and the fifth lens element is T45, and the following condition is satisfied: $T34<T45$, the configuration of the fourth lens element is more appropriate, and it is favorable for assembling the lens elements and correcting the aberration of the image capturing lens system.

When the axial distance between the fifth lens element and the sixth lens element is T56, the central thickness of the fifth lens element is CT5, and the following condition is satisfied: 2.0<T56/CT5, the interval between the fifth lens element and the sixth lens element can be effectively increased so as to accommodate other components, thereby further controlling the amount of incident light, length of exposure time and light filtration for an image so as to enhance the image adjustment capability.

When the focal length of the image capturing lens system is f, the focal length of the fourth lens element is f4, and the following condition is satisfied: −1.50<f/f4<−0.30, the accuracy of peripheral focus position of an image can be increased, and it is favorable for correcting a curved image so that the image approximates the imaged subject.

When the first lens element, the second lens element, the third lens element, the fourth lens element, the fifth lens element and the sixth lens element are all made of plastic material, an axial distance between the object-side surface of the first lens element and the image surface is TL, and the following condition is satisfied: TL<8.0 mm, the lens system's size can be controlled to keep the lens system compact.

According to the image capturing lens system of the present disclosure, the lens elements thereof can be made of glass or plastic material. When the lens elements are made of glass material, the distribution of the refractive power of the image capturing lens system may be more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more controllable variables for eliminating the aberration and to further decrease the required number of lens elements, the total track length of the image capturing lens system can be effectively reduced.

According to the image capturing lens system of the present disclosure, the image capturing lens system can include at least one stop, such as an aperture stop, a glare stop or a field stop, so as to favorably reduce the amount of stray light and thereby to improve the image quality.

According to the image capturing lens system of the present disclosure, a stop can be configured as a front stop or a middle stop. A front stop disposed between an imaged object and the first lens element can provide a longer distance between an exit pupil of the image capturing lens system and the image surface, thereby the generated telecentric effect improves the image-sensing efficiency of an image sensor, such as a CCD or CMOS sensor. A middle stop disposed between the first lens element and the image surface is favorable for enlarging the field of view of the image capturing lens system and thereby to provide a wider field of view for the same.

According to the image capturing lens system of the present disclosure, when the lens element has a convex surface and the region of convex shape is not defined, it indicates that the surface is convex in the paraxial region thereof; when the lens element has a concave surface and the region of concave shape is not defined, it indicates that the surface is concave in the paraxial region thereof. Likewise, when the region of refractive power or focal length of a lens element is not defined, it indicates that the region of refractive power or focal length of the lens element is in the paraxial region thereof.

According to the image capturing lens system of the present disclosure, an image surface of the image capturing lens system, based on the corresponding image sensor, can be a plane or a curved surface with any curvature, especially a curved surface being concave facing towards the object side.

The image capturing lens system of the present disclosure can be optionally applied to moving focus optical systems. According to the image capturing lens system of the present disclosure, the image capturing lens system features good correction capability and high image quality, and can be applied to 3D (three-dimensional) image capturing applications and electronic devices, such as digital cameras, mobile devices, digital tablets, smart TV, network surveillance devices, motion sensing input devices, driving recording systems, rear view camera systems, and wearable devices.

According to the present disclosure, an image capturing apparatus includes the aforementioned image capturing lens system and an image sensor, wherein the image sensor is disposed on or near an image surface of the image capturing lens system. Therefore, the design of the image capturing lens system enables the image capturing apparatus to achieve the best image quality. Preferably, the image capturing lens system can further include a barrel member, a holding member or a combination thereof.

Figure 10B:
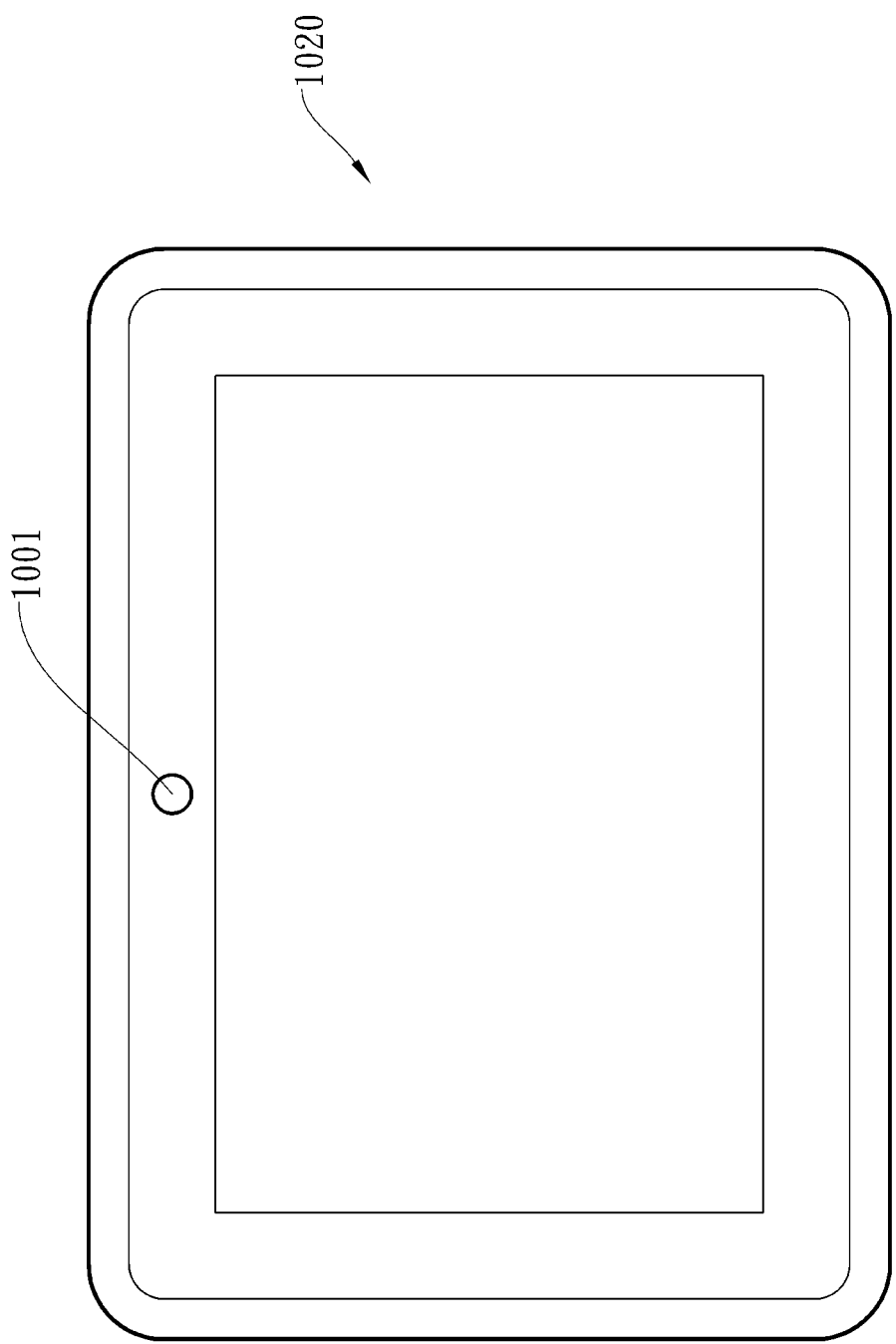
FIG. 10B shows a tablet personal computer with an image capturing apparatus of the present disclosure installed therein.
Figure 10C:
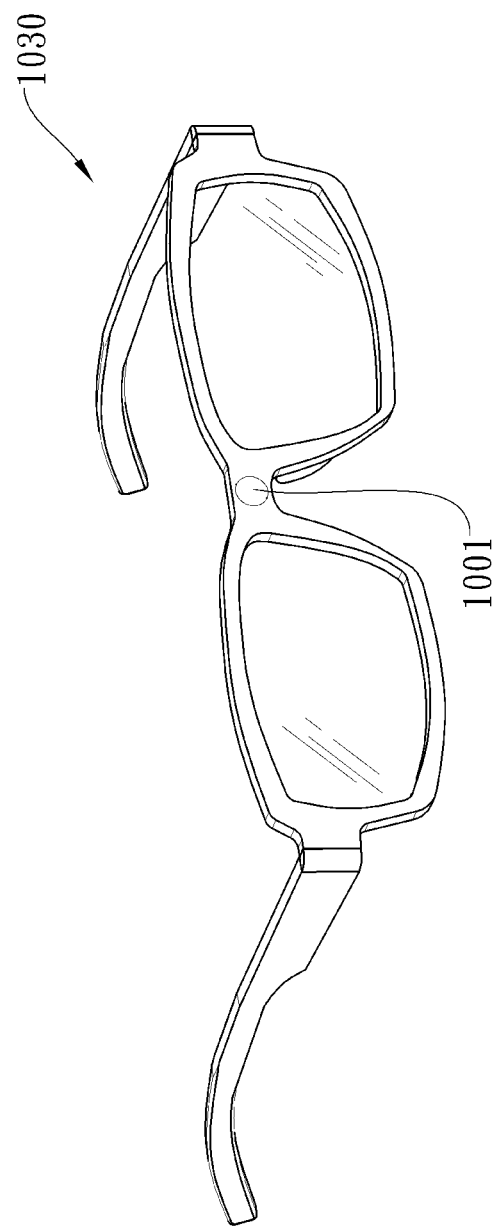
FIG. 10C shows a wearable device with an image capturing apparatus of the present disclosure installed therein.

Referring to FIG. 10A, FIG. 10B and FIG. 10C, an image capturing apparatus 1001 may be installed in an electronic device including, but not limited to, a smart phone 1010, a tablet personal computer 1020 or a wearable device 1030. The three exemplary figures of different electronic devices are only exemplary for showing the image capturing apparatus of the present disclosure installed in an electronic device, and the present disclosure is not limited thereto. Preferably, the electronic device can further include a control unit, a display unit, a storage unit, a random access memory unit (RAM) or a combination thereof.

According to the above description of the present disclosure, the following 1st-9th specific embodiments are provided for further explanation.

1st Embodiment

Figure 1B:
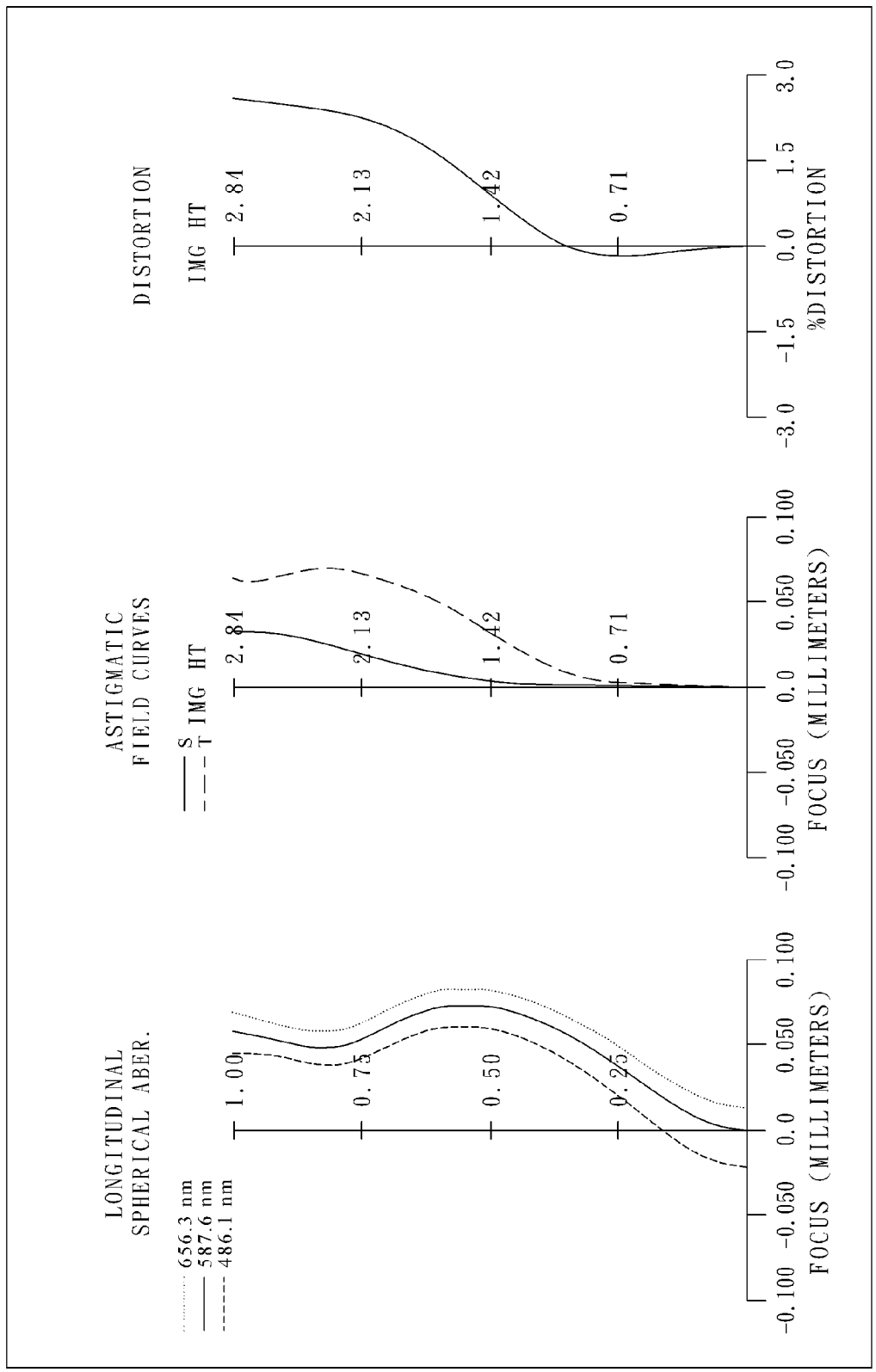
FIG. 1B shows longitudinal spherical aberration curves, astigmatic field curves and a distortion curve of the image capturing apparatus according to the 1st embodiment.

FIG. 1A is a schematic view of an image capturing apparatus according to the 1st embodiment of the present disclosure. FIG. 1B shows, in order from left to right, longitudinal spherical aberration curves, astigmatic field curves and a distortion curve of the image capturing apparatus according to the 1st embodiment.

In FIG. 1A, the image capturing apparatus includes an image capturing lens system (not otherwise herein labeled) of the present disclosure and an image sensor 190. The image capturing lens system includes, in order from an object side to an image side, a first lens element 110, an aperture stop 100, a second lens element 120, a third lens element 130, a fourth lens element 140, a fifth lens element 150, a sixth lens element 160, an IR-cut filter 170 and an image surface 180, wherein an axial air gap is arranged between every two adjacent lens elements.

The first lens element 110 with positive refractive power has an object-side surface 111 being convex in a paraxial region thereof and an image-side surface 112 being convex in a paraxial region thereof, which are both aspheric, and the first lens element 110 is made of plastic material.

The second lens element 120 with negative refractive power has an object-side surface 121 being convex in a paraxial region thereof and an image-side surface 122 being concave in a paraxial region thereof, which are both aspheric, and the second lens element 120 is made of plastic material.

The third lens element 130 with negative refractive power has an object-side surface 131 being convex in a paraxial region thereof and an image-side surface 132 being concave in a paraxial region thereof, which are both aspheric, and the third lens element 130 is made of plastic material.

The fourth lens element 140 with negative refractive power has an object-side surface 141 being convex in a paraxial region thereof and an image-side surface 142 being concave in a paraxial region thereof, which are both aspheric, and the fourth lens element 140 is made of plastic material.

The fifth lens element 150 with positive refractive power has an object-side surface 151 being convex in a paraxial region thereof and an image-side surface 152 being concave in a paraxial region thereof, which are both aspheric, and the fifth lens element 150 is made of plastic material.

The sixth lens element 160 with negative refractive power has an object-side surface 161 being concave in a paraxial region thereof and an image-side surface 162 being convex in a paraxial region thereof, which are both aspheric, and the sixth lens element 160 is made of plastic material.

At least one of the first lens element 110, the second lens element 120, the third lens element 130, the fourth lens element 140, the fifth lens element 150, and the sixth lens element 160 has at least one inflection point.

The IR-cut filter 170 is made of glass, and will not affect the focal length of the image capturing lens system. The image sensor 190 is disposed on or near the image surface 180 of the image capturing lens system.

The equation of the aspheric surface profiles is expressed as follows:

$$X(Y) = (Y^2/R)/(1 + sqrt(1 - (1+k)*(Y/R)^2)) + \sum_{i}(Ai)*(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the first embodiment, a focal length of the image capturing lens system is f, an f-number of the image capturing lens system is Fno, half of a maximal field of view of the image capturing lens system is HFOV, and these parameters have the following values: f=6.44 mm; Fno=3.00; and HFOV=23.0 degrees.

In the first embodiment, a maximum refractive index among the refractive indices of the first lens element 110, the second lens element 120, the third lens element 130, the fourth lens element 140, the fifth lens element 150, and the sixth lens element 160 is Nmax, and the parameter has the following value: Nmax=1.639.

In the first embodiment, an Abbe number of the second lens element 120 is V2, an Abbe number of the third lens element 130 is V3, an Abbe number of the fifth lens element 150 is V5, an Abbe number of the fourth lens element 140 is V4, and they satisfy the condition: (V2+V3+V5)/V4=1.26.

In the first embodiment, a central thickness of the fourth lens element 140 is CT4, a central thickness of the fifth lens element 150 is CT5, and they satisfy the condition: CT4/CT5=0.96.

In the first embodiment, an axial distance between the fifth lens element 150 and the sixth lens element 160 is T56, the central thickness of the fifth lens element 150 is CT5, and they satisfy the condition: T56/CT5=3.84.

In the first embodiment, the focal length of the image capturing lens system is f, a curvature radius of the object-side surface 111 of the first lens element 110 is R1, and they satisfy the condition: f/R1=3.84.

In the first embodiment, a curvature radius of the image-side surface 122 of the second lens element 120 is R4, a curvature radius of the object-side surface 121 of the second lens element 120 is R3, and they satisfy the condition: R4/R3=0.06.

In the first embodiment, the focal length of the image capturing lens system is f, a curvature radius of the object-side surface 161 of the sixth lens element 160 is R11, a curvature radius of the image-side surface 162 of the sixth lens element 160 is R12, and they satisfy the condition: (f/R11)+(f/R12)=−3.37.

In the first embodiment, a focal length of the fourth lens element 140 is f4, a focal length of the third lens element 130 is f3, and they satisfy the condition: f4/|f3|=−0.07.

In the first embodiment, the focal length of the image capturing lens system is f, the focal length of the fourth lens element 140 is f4, and they satisfy the condition: f/f4=−0.73.

In the first embodiment, the axial distance between the fifth lens element 150 and the sixth lens element 160 is T56, a sum of axial air gaps between every two adjacent lens elements is ΣAT, and they satisfy the condition: T56/(ΣAT−T56)=1.94.

In the first embodiment, half of the maximal field of view of the image capturing lens system is HFOV, and it satisfies the condition: tan(2*HFOV)=1.03.

In the first embodiment, a distance in parallel with an optical axis from an intersection of the image-side surface 162 of the sixth lens element 160 and the optical axis to a maximum effective radius position on the image-side surface 162 of the sixth lens element 160 is SAG62, a central thickness of the sixth lens element 160 is CT6, and they satisfy the condition: SAG62/CT6=−2.03.

In the first embodiment, an axial distance between the aperture stop 100 and the image-side surface 162 of the sixth lens element 160 is SD, an axial distance between the object-side surface 111 of the first lens element 110 and the image-side surface 162 of the sixth lens element 160 is TD, and they satisfy the condition: SD/TD=0.85.

In the first embodiment, an axial distance between the image-side surface 162 of the sixth lens element 160 and the image surface 180 is BL, the axial distance between the object-side surface 111 of the first lens element 110 and the image-side surface 162 of the sixth lens element 160 is TD, and they satisfy the condition: BL/TD=0.18.

In the first embodiment, an axial distance between the object-side surface 111 of the first lens element 110 and the image surface 180 is TL, and the parameter has the following value: TL=6.08 mm.

TABLE 1

(Embodiment 1)
f = 6.44 mm, Fno = 3.00, HFOV = 23.0 deg.

| Surface # | | Curvature Radius | | Thickness | Material | Index | Abbe # | Focal Length |
|---|---|---|---|---|---|---|---|---|
| 0 | Object | Plano | Infinity | | | | | |
| 1 | Lens 1 | 1.679 | ASP | 0.753 | Plastic | 1.544 | 55.9 | 3.01 |
| 2 | | −59.361 | ASP | 0.012 | | | | |
| 3 | Ape. Stop | Plano | | 0.043 | | | | |
| 4 | Lens 2 | 60.100 | ASP | 0.286 | Plastic | 1.639 | 23.5 | −6.43 |
| 5 | | 3.840 | ASP | 0.263 | | | | |
| 6 | Lens 3 | 11.846 | ASP | 0.479 | Plastic | 1.639 | 23.5 | −123.59 |
| 7 | | 10.138 | ASP | 0.134 | | | | |
| 8 | Lens 4 | 23.471 | ASP | 0.388 | Plastic | 1.544 | 55.9 | −8.76 |
| 9 | | 3.939 | ASP | 0.352 | | | | |
| 10 | Lens 5 | 6.639 | ASP | 0.406 | Plastic | 1.639 | 23.5 | 17.98 |
| 11 | | 15.355 | ASP | 1.559 | | | | |
| 12 | Lens 6 | −2.708 | ASP | 0.488 | Plastic | 1.544 | 55.9 | −8.94 |
| 13 | | −6.493 | ASP | 0.300 | | | | |
| 14 | IR-cut filter | Plano | | 0.210 | Glass | 1.517 | 64.2 | — |
| 15 | | Plano | | 0.411 | | | | |
| 16 | Image Surface | Plano | | — | | | | |

*Reference Wavelength is d-line 587.6 nm

TABLE 2

| Aspheric Coefficients | | | | | | |
|---|---|---|---|---|---|---|
| Surface # | 1 | 2 | 4 | 5 | 6 | 7 |
| k = | −5.9905E+00 | −9.0000E+01 | 2.3396E+01 | 7.8630E+00 | −2.4799E+01 | 8.6927E+01 |
| A4 = | 1.4747E−01 | −1.1657E−01 | −1.5617E−01 | −1.2885E−01 | −1.2991E−01 | −1.8543E−01 |
| A6 = | −9.0801E−02 | 3.4557E−01 | 5.3312E−01 | 3.5786E−01 | 2.0201E−01 | 3.2571E−01 |
| A8 = | 6.4144E−02 | −5.1313E−01 | −7.6102E−01 | −3.7793E−01 | −1.9648E−02 | −1.5259E−01 |
| A10 = | −3.2126E−02 | 4.0320E−01 | 6.1470E−01 | 2.3337E−01 | 1.4381E−02 | −6.2244E−02 |
| A12 = | 5.2415E−03 | −1.6726E−01 | −2.5561E−01 | 1.0249E−01 | −1.2040E−03 | 2.3679E−01 |
| A14 = | −4.9261E−04 | 2.8815E−02 | 4.2637E−02 | −1.3265E−01 | −2.1851E−02 | −1.3582E−01 |

| Surface # | 8 | 9 | 10 | 11 | 12 | 13 |
|---|---|---|---|---|---|---|
| k = | 8.4052E+01 | −7.9854E+00 | −5.2127E+00 | 2.8673E+01 | 1.6311E−01 | −1.5781E+01 |
| A4 = | −2.0076E−01 | −1.1710E−01 | −1.6121E−01 | −9.8368E−02 | −1.0454E−01 | −1.2563E−01 |
| A6 = | 4.8150E−01 | 4.0987E−01 | 1.7628E−01 | 9.3820E−02 | 1.0696E−01 | 9.0710E−02 |
| A8 = | −5.5700E−01 | −5.5591E−01 | −9.5116E−02 | −5.6034E−02 | −6.1210E−02 | −4.0510E−02 |
| A10 = | 2.7880E−01 | 4.0300E−01 | 2.6181E−02 | 3.3588E−02 | 1.9174E−02 | 9.7461E−03 |
| A12 = | 3.5831E−02 | −1.5234E−01 | −3.1053E−03 | −1.5119E−02 | −2.9574E−03 | −1.1985E−03 |
| A14 = | −5.0224E−02 | 2.5138E−02 | −3.5228E−04 | 3.5280E−03 | 1.9326E−04 | 4.7340E−05 |
| A16 = | | | | −3.3686E−04 | −2.4189E−06 | 2.2159E−06 |

2nd Embodiment

Figure 2A:
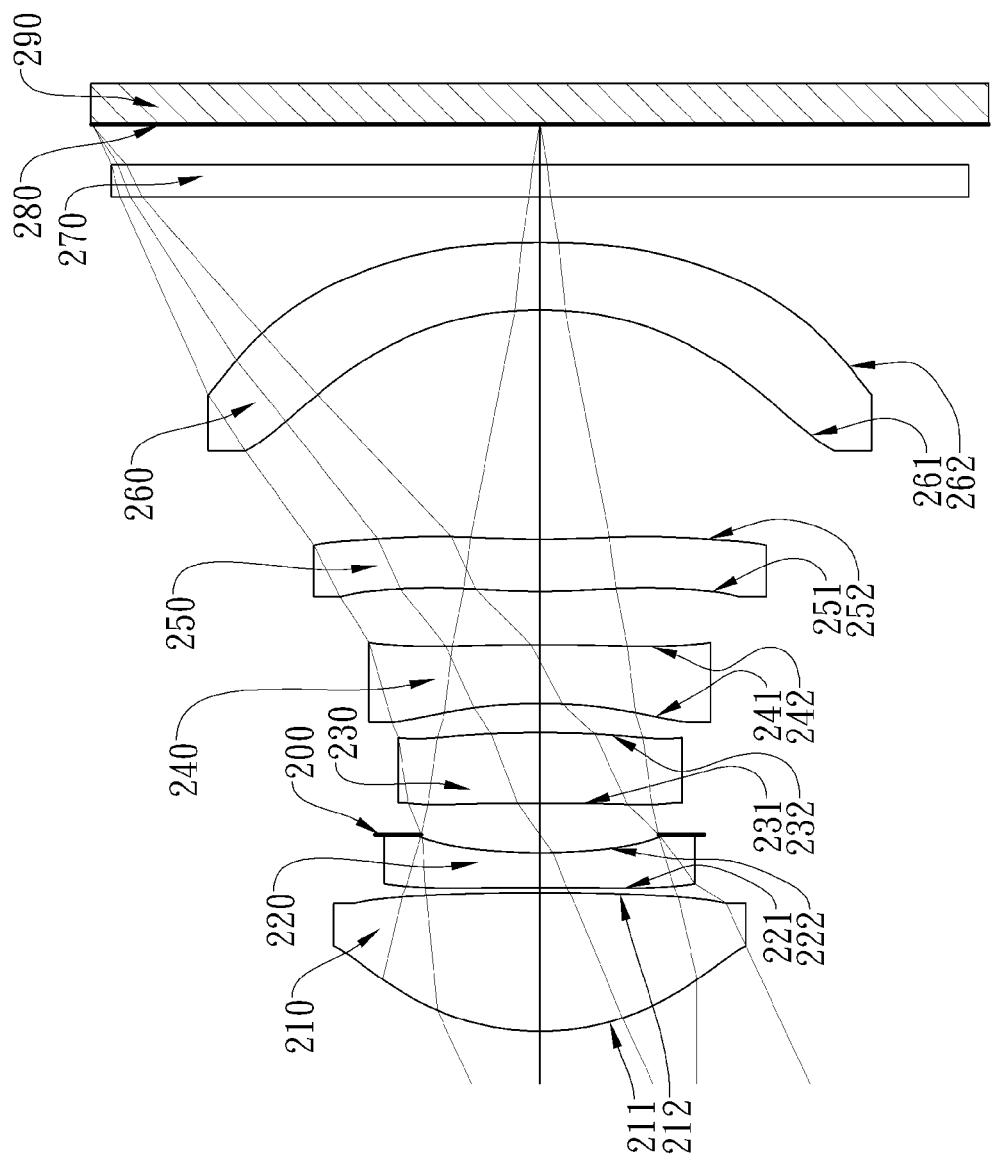
FIG. 2A is a schematic view of an image capturing apparatus according to the 2nd embodiment of the present disclosure.
Figure 2B:
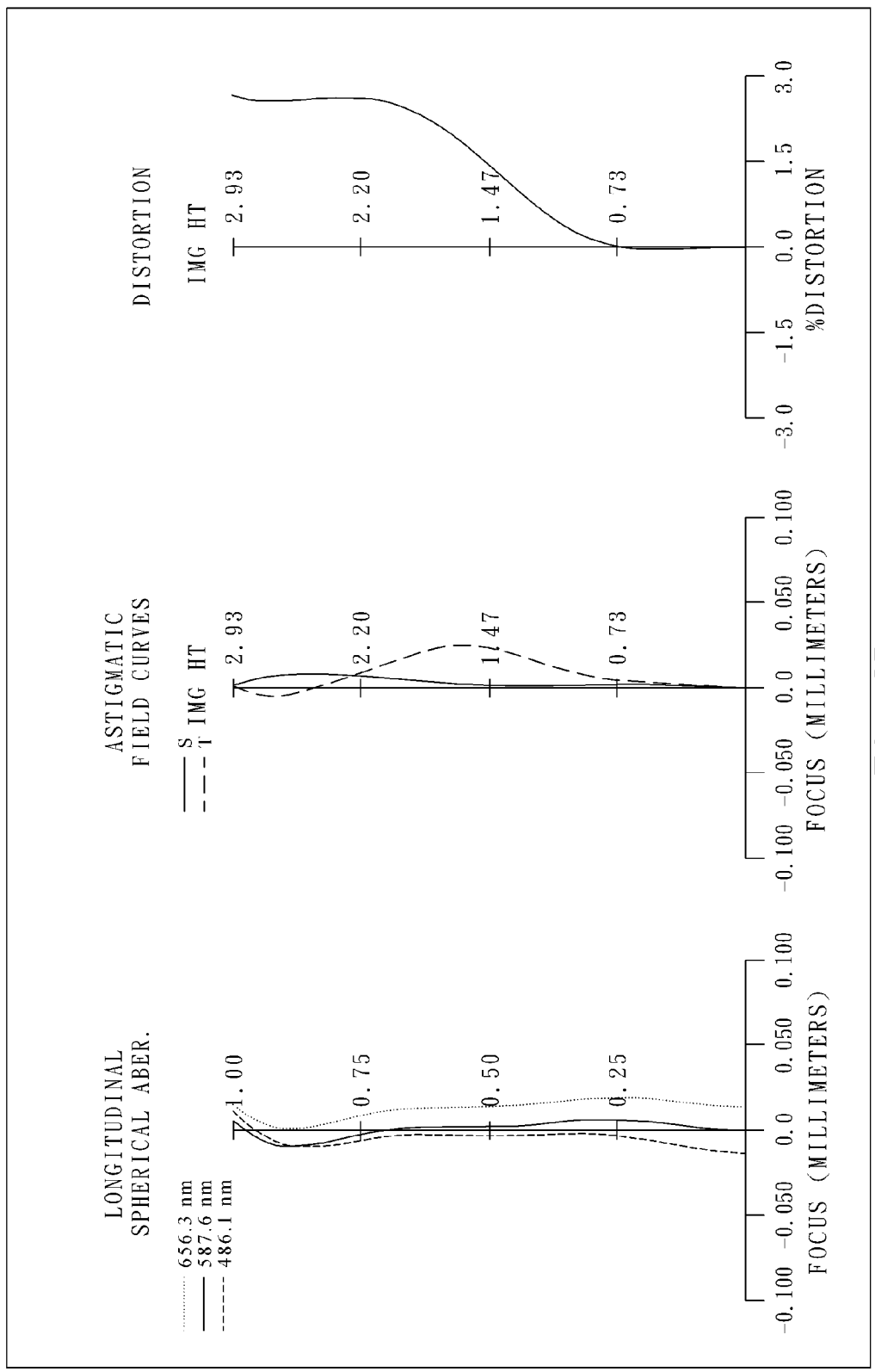
FIG. 2B shows longitudinal spherical aberration curves, astigmatic field curves and a distortion curve of the image capturing apparatus according to the 2nd embodiment.

FIG. 2A is a schematic view of an image capturing apparatus according to the 2nd embodiment of the present disclosure. FIG. 2B shows, in order from left to right, longitudinal spherical aberration curves, astigmatic field curves and a distortion curve of the image capturing apparatus according to the 2nd embodiment.

In FIG. 2A, the image capturing apparatus includes an image capturing lens system (not otherwise herein labeled) of the present disclosure and an image sensor 290. The image capturing lens system includes, in order from an object side to an image side, a first lens element 210, a second lens element 220, an aperture stop 200, a third lens element 230, a fourth lens element 240, a fifth lens element 250, a sixth lens element 260, an IR-cut filter 270 and an image surface 280, wherein an axial air gap is arranged between every two adjacent lens elements.

The first lens element 210 with positive refractive power has an object-side surface 211 being convex in a paraxial region thereof and an image-side surface 212 being convex in a paraxial region thereof, which are both aspheric, and the first lens element 210 is made of plastic material.

The second lens element 220 with negative refractive power has an object-side surface 221 being convex in a paraxial region thereof and an image-side surface 222 being concave in a paraxial region thereof, which are both aspheric, and the second lens element 220 is made of plastic material.

The third lens element 230 with positive refractive power has an object-side surface 231 being convex in a paraxial region thereof and an image-side surface 232 being convex in a paraxial region thereof, which are both aspheric, and the third lens element 230 is made of plastic material.

The fourth lens element 240 with negative refractive power has an object-side surface 241 being concave in a paraxial region thereof and an image-side surface 242 being convex in a paraxial region thereof, which are both aspheric, and the fourth lens element 240 is made of plastic material.

The fifth lens element 250 with positive refractive power has an object-side surface 251 being convex in a paraxial region thereof and an image-side surface 252 being concave in a paraxial region thereof, which are both aspheric, and the fifth lens element 250 is made of plastic material.

The sixth lens element 260 with negative refractive power has an object-side surface 261 being concave in a paraxial region thereof and an image-side surface 262 being convex in a paraxial region thereof, which are both aspheric, and the sixth lens element 260 is made of plastic material.

At least one of the first lens element 210, the second lens element 220, the third lens element 230, the fourth lens element 240, the fifth lens element 250, and the sixth lens element 260 has at least one inflection point.

The IR-cut filter 270 is made of glass, and will not affect the focal length of the image capturing lens system. The image sensor 290 is disposed on or near the image surface 280 of the image capturing lens system.

The detailed optical data of the second embodiment are shown in TABLE 3, and the aspheric surface data are shown in TABLE 4, wherein the units of the curvature radius, the thickness and the focal length are expressed in mm, and HFOV is half of the maximal field of view.

In the 2nd embodiment, the equation of the aspheric surface profiles of the aforementioned lens elements is the same as the equation of the 1st embodiment. Also, the definitions of these parameters shown in Table 5 below are the same as those stated in the 1st embodiment with corresponding values for the 2nd embodiment, so an explanation in this regard will not be provided again.

Moreover, these parameters can be calculated from Table 3 and Table 4 and satisfy the conditions stated in Table 5.

TABLE 5

| $2^{nd}$ Embodiment | | | |
|---|---|---|---|
| f [mm] | 6.18 | (f/R11) + (f/R12) | −3.20 |
| Fno | 3.00 | f4/\|f3\| | −0.39 |
| HFOV [deg.] | 24.8 | f/f4 | −0.77 |
| Nmax | 1.650 | T56/(ΣAT − T56) | 1.67 |
| (V2 + V3 + V5)/V4 | 1.23 | tan(2 * HFOV) | 1.18 |
| CT4/CT5 | 1.13 | SAG62/CT6 | −2.26 |
| T56/CT5 | 4.42 | SD/TD | 0.75 |

TABLE 3

(Embodiment 2)
f = 6.18 mm, Fno = 3.00, HFOV = 24.8 deg.

| Surface # | | Curvature Radius | | Thickness | Material | Index | Abbe # | Focal Length |
|---|---|---|---|---|---|---|---|---|
| 0 | Object | Plano | Infinity | | | | | |
| 1 | Lens 1 | 1.684 | ASP | 0.909 | Plastic | 1.544 | 55.9 | 2.95 |
| 2 | | −28.657 | ASP | 0.032 | | | | |
| 3 | Lens 2 | 64.812 | ASP | 0.230 | Plastic | 1.650 | 21.4 | −5.63 |
| 4 | | 3.456 | ASP | 0.118 | | | | |
| 5 | Ape. Stop | Plano | | 0.206 | | | | |
| 6 | Lens 3 | 417.693 | ASP | 0.460 | Plastic | 1.650 | 21.4 | 20.57 |
| 7 | | −13.801 | ASP | 0.193 | | | | |
| 8 | Lens 4 | −3.808 | ASP | 0.385 | Plastic | 1.535 | 55.7 | −8.01 |
| 9 | | −35.505 | ASP | 0.350 | | | | |
| 10 | Lens 5 | 4.183 | ASP | 0.340 | Plastic | 1.614 | 25.6 | 26.50 |
| 11 | | 5.456 | ASP | 1.504 | | | | |
| 12 | Lens 6 | −2.674 | ASP | 0.440 | Plastic | 1.535 | 55.7 | −8.45 |
| 13 | | −6.927 | ASP | 0.300 | | | | |
| 14 | IR-cut filter | Plano | | 0.210 | Glass | 1.517 | 64.2 | — |
| 15 | | Plano | | 0.266 | | | | |
| 16 | Image Surface | Plano | | — | | | | |

*Reference wavelength is d-line 587.6 nm

TABLE 4

| Aspheric Coefficients | | | | | | |
|---|---|---|---|---|---|---|
| Surface # | 1 | 2 | 3 | 4 | 6 | 7 |
| k = | −5.9943E+00 | −9.0000E+01 | −8.8996E+01 | 8.0345E+00 | −9.0000E+01 | −4.3529E+01 |
| A4 = | 1.5145E−01 | −1.1312E−01 | −1.5699E−01 | −1.2580E−01 | −1.3534E−01 | −1.9104E−01 |
| A6 = | −9.3675E−02 | 3.4248E−01 | 5.3595E−01 | 3.5490E−01 | 2.0289E−01 | 3.2045E−01 |
| A8 = | 6.3668E−02 | −5.1941E−01 | −7.5985E−01 | −3.7679E−01 | −2.1876E−02 | −1.5352E−01 |
| A10 = | −2.7898E−02 | 4.0640E−01 | 6.1262E−01 | 2.3150E−01 | 1.3152E−02 | −6.2343E−02 |
| A12 = | 3.9576E−03 | −1.6201E−01 | −2.6037E−01 | 9.7626E−02 | −1.6879E−03 | 2.3727E−01 |
| A14 = | −2.6528E−04 | 2.5828E−02 | 4.5528E−02 | −1.3744E−01 | −2.2607E−02 | −1.3464E−01 |

| Surface # | 8 | 9 | 10 | 11 | 12 | 13 |
|---|---|---|---|---|---|---|
| k = | −1.2959E+01 | 9.0000E+01 | −1.5700E+01 | −4.5303E+01 | 1.5424E−01 | −1.3680E+01 |
| A4 = | −1.9982E−01 | −1.1381E−01 | −1.9679E−01 | −1.2469E−01 | −1.0845E−01 | −1.2308E−01 |
| A6 = | 4.8260E−01 | 4.1034E−01 | 1.7804E−01 | 9.4998E−02 | 1.0688E−01 | 9.0671E−02 |
| A8 = | −5.5778E−01 | −5.5611E−01 | −9.3912E−02 | −5.5372E−02 | −6.1194E−02 | −4.0523E−02 |
| A10 = | 2.7871E−01 | 4.0286E−01 | 2.6458E−02 | 3.3669E−02 | 1.9178E−02 | 9.7491E−03 |
| A12 = | 3.5480E−02 | −1.5224E−01 | −3.1006E−03 | −1.5099E−02 | −2.9566E−03 | −1.1980E−03 |
| A14 = | −5.1310E−02 | 2.5350E−02 | −3.8691E−04 | 3.5313E−03 | 1.9342E−04 | 4.7253E−05 |
| A16 = | | | | −3.3755E−04 | −2.3921E−06 | 2.1772E−06 |

TABLE 5-continued

*2$^{nd}$ Embodiment*

| f/R1 | 3.67 | BL/TD | 0.15 |
|---|---|---|---|
| R4/R3 | 0.05 | TL [mm] | 5.94 |

3rd Embodiment

Figure 3A:
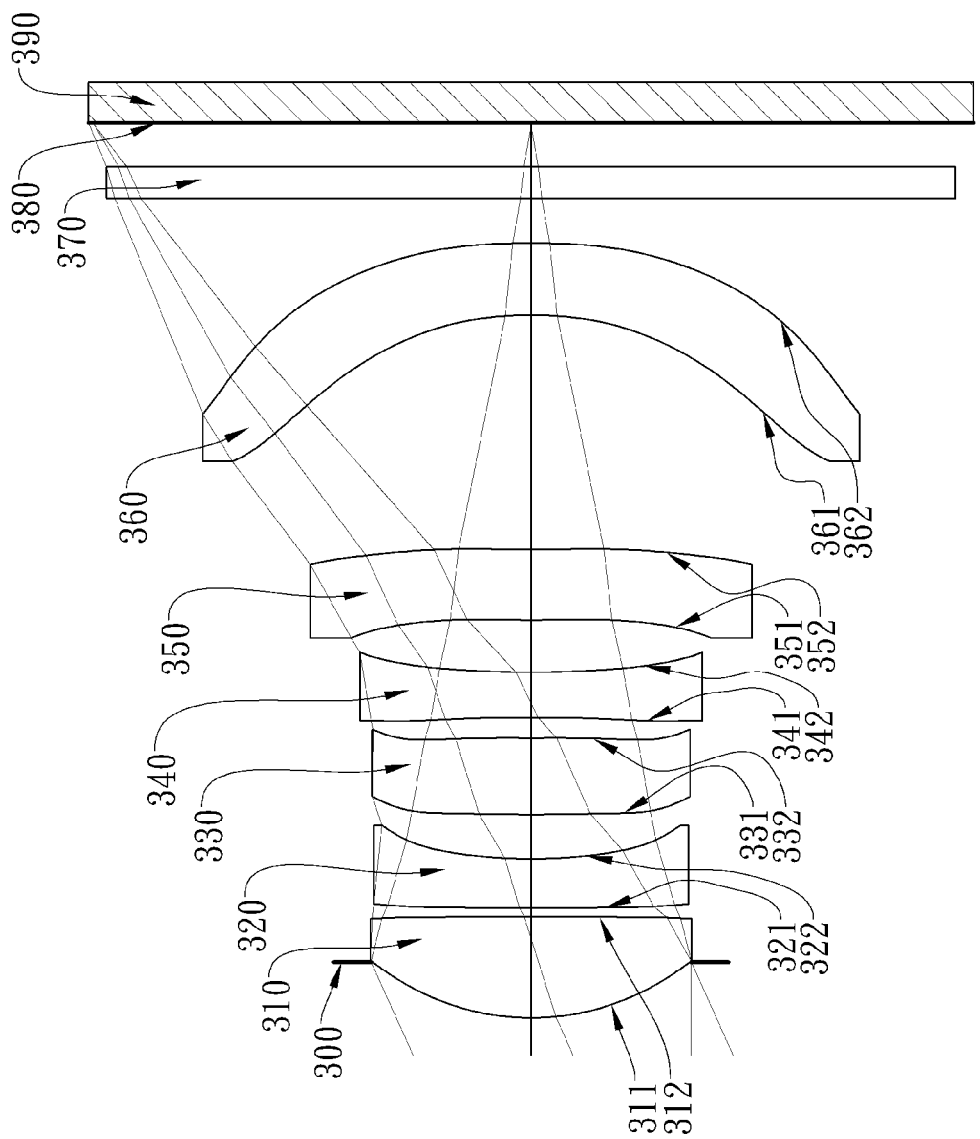
FIG. 3A is a schematic view of an image capturing apparatus according to the 3rd embodiment of the present disclosure.
Figure 3B:
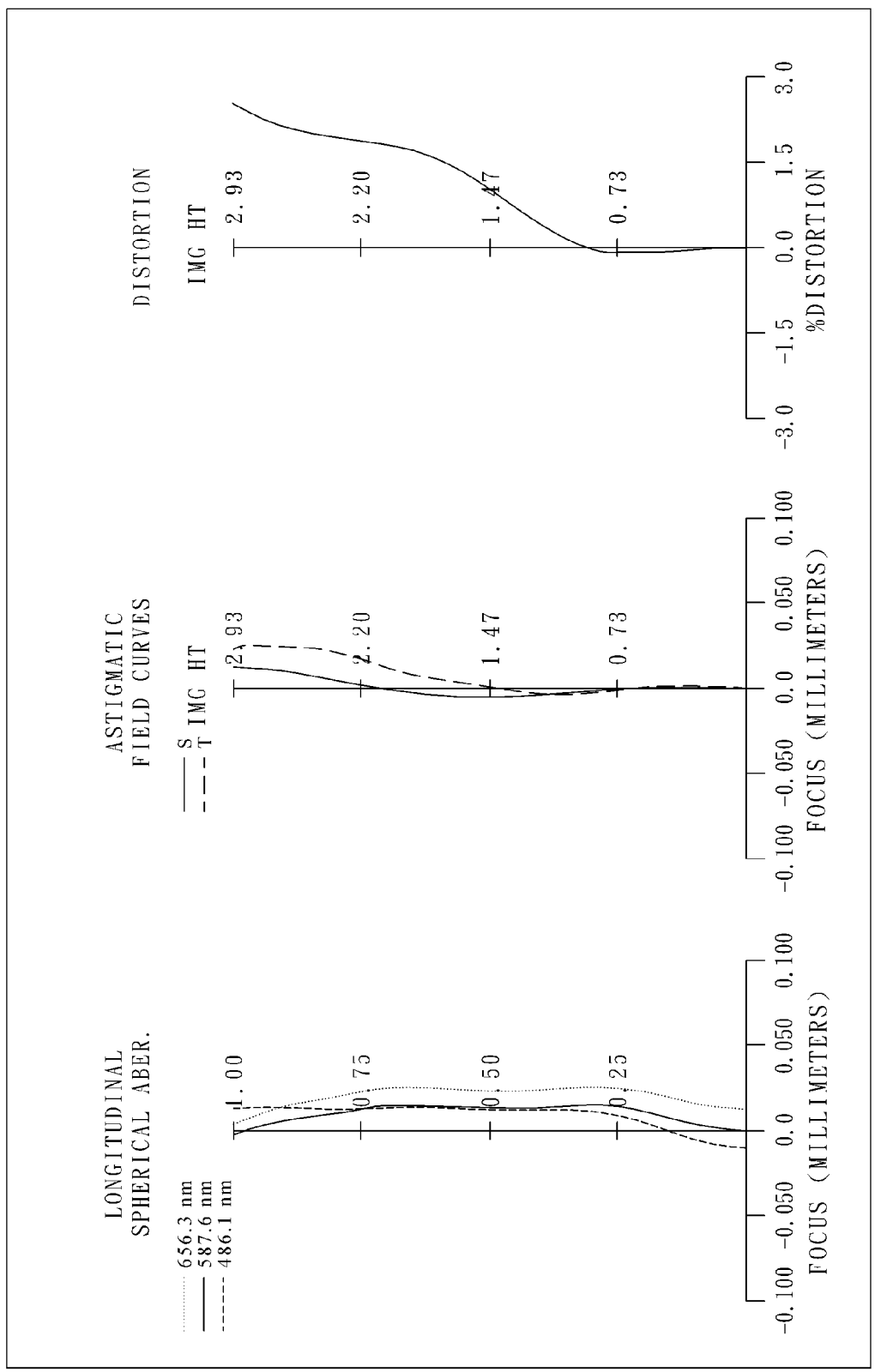
FIG. 3B shows longitudinal spherical aberration curves, astigmatic field curves and a distortion curve of the image capturing apparatus according to the 3rd embodiment.

FIG. 3A is a schematic view of an image capturing apparatus according to the 3rd embodiment of the present disclosure. FIG. 3B shows, in order from left to right, longitudinal spherical aberration curves, astigmatic field curves and a distortion curve of the image capturing apparatus according to the 3rd embodiment.

In FIG. 3A, the image capturing apparatus includes an image capturing lens system (not otherwise herein labeled) of the present disclosure and an image sensor 390. The image capturing lens system includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image surface 380, wherein an axial air gap is arranged between every two adjacent lens elements.

The first lens element 310 with positive refractive power has an object-side surface 311 being convex in a paraxial region thereof and an image-side surface 312 being concave in a paraxial region thereof, which are both aspheric, and the first lens element 310 is made of plastic material.

The second lens element 320 with negative refractive power has an object-side surface 321 being convex in a paraxial region thereof and an image-side surface 322 being concave in a paraxial region thereof, which are both aspheric, and the second lens element 320 is made of plastic material.

The third lens element 330 with positive refractive power has an object-side surface 331 being convex in a paraxial region thereof and an image-side surface 332 being concave in a paraxial region thereof, which are both aspheric, and the third lens element 330 is made of plastic material.

The fourth lens element 340 with negative refractive power has an object-side surface 341 being concave in a paraxial region thereof and an image-side surface 342 being concave in a paraxial region thereof, which are both aspheric, and the fourth lens element 340 is made of plastic material.

The fifth lens element 350 with positive refractive power has an object-side surface 351 being convex in a paraxial region thereof and an image-side surface 352 being concave in a paraxial region thereof, which are both aspheric, and the fifth lens element 350 is made of plastic material.

The sixth lens element 360 with negative refractive power has an object-side surface 361 being concave in a paraxial region thereof and an image-side surface 362 being convex in a paraxial region thereof, which are both aspheric, and the sixth lens element 360 is made of plastic material.

At least one of the first lens element 310, the second lens element 320, the third lens element 330, the fourth lens element 340, the fifth lens element 350, and the sixth lens element 360 has at least one inflection point.

The IR-cut filter 370 is made of glass, and will not affect the focal length of the image capturing lens system. The image sensor 390 is disposed on or near the image surface 380 of the image capturing lens system.

The detailed optical data of the third embodiment are shown in TABLE 6, and the aspheric surface data are shown in TABLE 7, wherein the units of the curvature radius, the thickness and the focal length are expressed in mm, and HFOV is half of the maximal field of view.

TABLE 6

(Embodiment 3)
f = 6.32 mm, Fno = 2.95, HFOV = 24.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.374 | | | | |
| 2 | Lens 1 | 1.666 | ASP | 0.678 | Plastic | 1.544 | 55.9 | 3.10 |
| 3 | | 128.006 | ASP | 0.058 | | | | |
| 4 | Lens 2 | 18.721 | ASP | 0.330 | Plastic | 1.650 | 21.4 | −5.83 |
| 5 | | 3.127 | ASP | 0.297 | | | | |
| 6 | Lens 3 | 10.989 | ASP | 0.512 | Plastic | 1.650 | 21.4 | 22.27 |
| 7 | | 44.874 | ASP | 0.137 | | | | |
| 8 | Lens 4 | −55.952 | ASP | 0.305 | Plastic | 1.535 | 55.7 | −10.02 |
| 9 | | 5.939 | ASP | 0.350 | | | | |
| 10 | Lens 5 | 10.073 | ASP | 0.473 | Plastic | 1.614 | 25.6 | 50.53 |
| 11 | | 14.648 | ASP | 1.572 | | | | |
| 12 | Lens 6 | −2.650 | ASP | 0.483 | Plastic | 1.535 | 55.7 | −8.89 |
| 13 | | −6.360 | ASP | 0.300 | | | | |
| 14 | IR-cut filter | Plano | | 0.210 | Glass | 1.517 | 64.2 | — |
| 15 | | Plano | | 0.297 | | | | |
| 16 | Image Surface | Plano | | — | | | | |

\* Reference wavelength is d-line 587.6 nm

TABLE 7

Aspheric Coefficients

| Surface # | 2 | 3 | 4 | 5 | 6 | 7 |
|---|---|---|---|---|---|---|
| k = | −5.8926E+00 | −9.0000E+01 | 9.9788E+00 | 7.7802E+00 | 8.9282E+01 | 9.0000E+01 |
| A4 = | 1.5513E−01 | −1.0983E−01 | −1.6760E−01 | −1.5920E−01 | −1.4218E−01 | −1.9047E−01 |

TABLE 7-continued

Aspheric Coefficients

| A6 = | −9.2786E−02 | 3.5001E−01 | 5.2862E−01 | 3.5611E−01 | 2.0120E−01 | 3.1830E−01 |
| A8 = | 6.4811E−02 | −5.1777E−01 | −7.5912E−01 | −3.7882E−01 | −2.2099E−02 | −1.5281E−01 |
| A10 = | −2.7874E−02 | 3.9711E−01 | 6.1176E−01 | 2.2541E−01 | 1.6488E−02 | −6.0484E−02 |
| A12 = | 4.1702E−03 | −1.5903E−01 | −2.6306E−01 | 8.7241E−02 | −2.1009E−03 | 2.4016E−01 |
| A14 = | −7.4284E−04 | 2.5610E−02 | 4.5981E−02 | −1.4784E−01 | −2.2128E−02 | −1.3103E−01 |

| Surface # | 8 | 9 | 10 | 11 | 12 | 13 |
| --- | --- | --- | --- | --- | --- | --- |
| k = | 9.0000E+01 | −4.5413E+01 | 6.1259E+01 | 7.3183E+01 | 1.5394E−01 | −4.9420E+00 |
| A4 = | −1.9565E−01 | −1.1113E−01 | −2.1663E−01 | −1.2277E−01 | −1.0998E−01 | −1.2545E−01 |
| A6 = | 4.8597E−01 | 4.1151E−01 | 1.7081E−01 | 9.0472E−02 | 1.0696E−01 | 9.0335E−02 |
| A8 = | −5.5848E−01 | −5.5621E−01 | −9.1516E−02 | −5.5362E−02 | −6.1176E−02 | −4.0521E−02 |
| A10 = | 2.7710E−01 | 4.0238E−01 | 2.5964E−02 | 3.3813E−02 | 1.9180E−02 | 9.7552E−03 |
| A12 = | 3.2610E−02 | −1.5222E−01 | −4.0975E−02 | −1.5061E−02 | −2.9561E−03 | −1.1967E−03 |
| A14 = | −5.5172E−02 | 2.5697E−02 | −1.2688E−03 | 3.5288E−03 | 1.9352E−04 | 4.7395E−05 |
| A16 = | | | | −3.4536E−04 | −2.3804E−06 | 2.1813E−06 |

In the 3rd embodiment, the equation of the aspheric surface profiles of the aforementioned lens elements is the same as the equation of the 1st embodiment. Also, the definitions of these parameters shown in Table 8 below are the same as those stated in the 1st embodiment with corresponding values for the 3rd embodiment, so an explanation in this regard will not be provided again.

Moreover, these parameters can be calculated from Table 6 and Table 7 and satisfy the conditions stated in Table 8.

TABLE 8

3rd Embodiment

| f [mm] | 6.32 | (f/R11) + (f/R12) | −3.38 |
| --- | --- | --- | --- |
| Fno | 2.95 | f4/|f3| | −0.45 |
| HFOV [deg.] | 24.3 | f/f4 | −0.63 |
| Nmax | 1.650 | T56/(ΣAT − T56) | 1.87 |
| (V2 + V3 + V5)/V4 | 1.23 | tan(2 * HFOV) | 1.13 |
| CT4/CT5 | 0.64 | SAG62/CT6 | −2.37 |
| T56/CT5 | 3.32 | SD/TD | 0.93 |
| f/R1 | 3.80 | BL/TD | 0.16 |
| R4/R3 | 0.17 | TL [mm] | 6.00 |

4th Embodiment

Figure 4A:
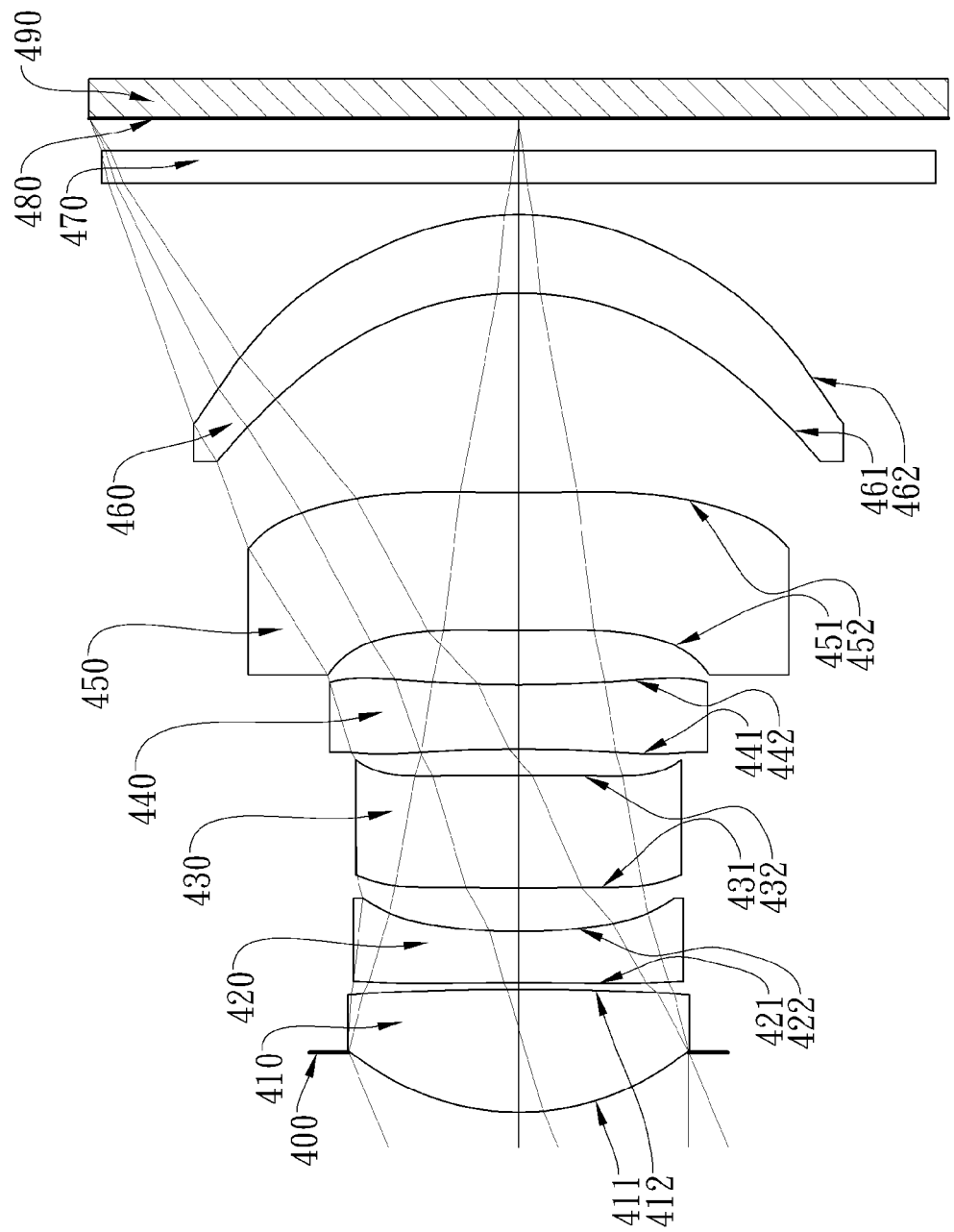
FIG. 4A is a schematic view of an image capturing apparatus according to the 4th embodiment of the present disclosure.
Figure 4B:
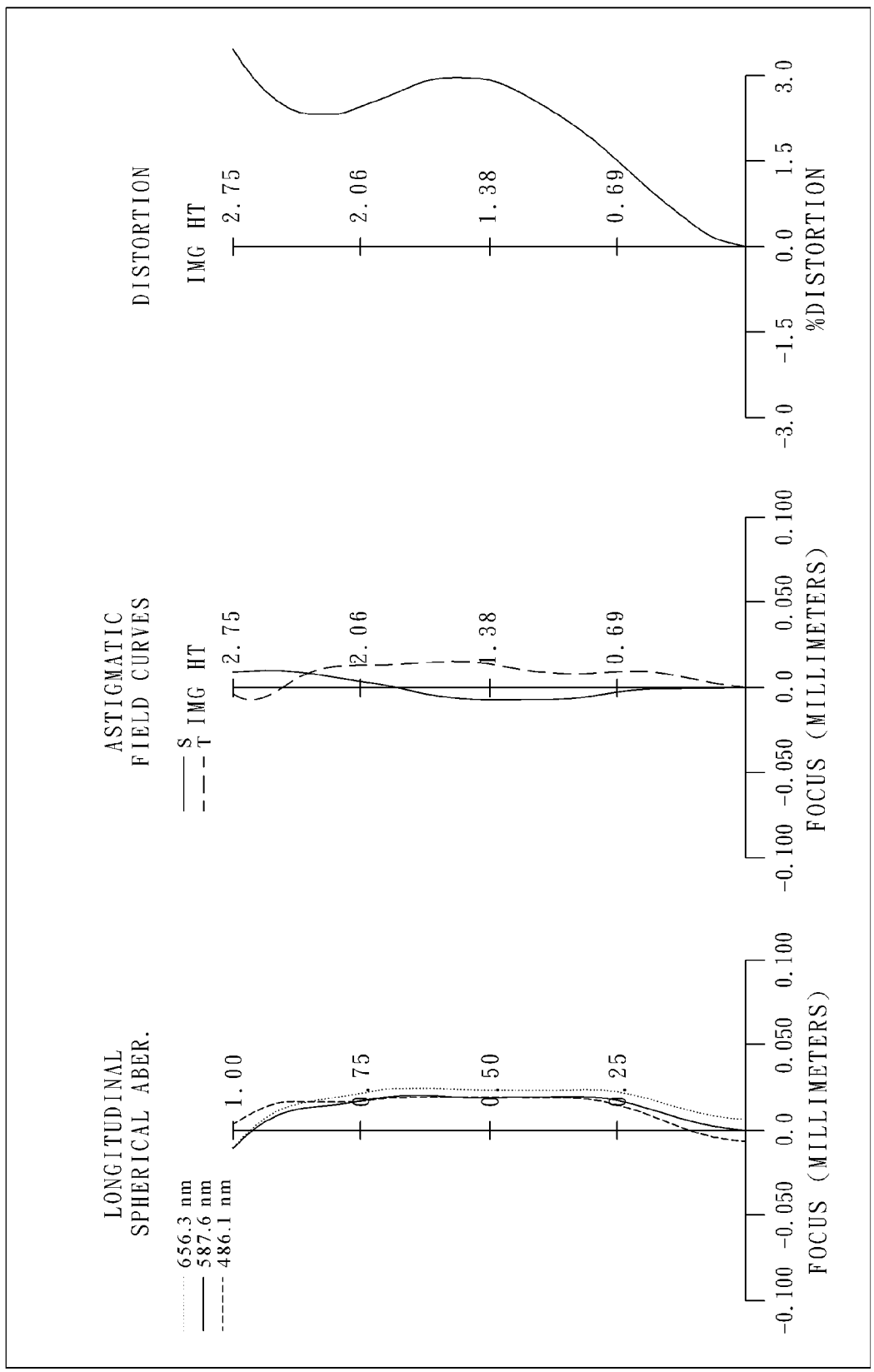
FIG. 4B shows longitudinal spherical aberration curves, astigmatic field curves and a distortion curve of the image capturing apparatus according to the 4th embodiment.

FIG. 4A is a schematic view of an image capturing apparatus according to the 4th embodiment of the present disclosure. FIG. 4B shows, in order from left to right, longitudinal spherical aberration curves, astigmatic field curves and a distortion curve of the image capturing apparatus according to the 4th embodiment.

In FIG. 4A, the image capturing apparatus includes an image capturing lens system (not otherwise herein labeled) of the present disclosure and an image sensor 490. The image capturing lens system includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image surface 480, wherein an axial air gap is arranged between every two adjacent lens elements.

The first lens element 410 with positive refractive power has an object-side surface 411 being convex in a paraxial region thereof and an image-side surface 412 being convex in a paraxial region thereof, which are both aspheric, and the first lens element 410 is made of plastic material.

The second lens element 420 with negative refractive power has an object-side surface 421 being convex in a paraxial region thereof and an image-side surface 422 being concave in a paraxial region thereof, which are both aspheric, and the second lens element 420 is made of plastic material.

The third lens element 430 with positive refractive power has an object-side surface 431 being convex in a paraxial region thereof and an image-side surface 432 being concave in a paraxial region thereof, which are both aspheric, and the third lens element 430 is made of plastic material.

The fourth lens element 440 with negative refractive power has an object-side surface 441 being concave in a paraxial region thereof and an image-side surface 442 being concave in a paraxial region thereof, which are both aspheric, and the fourth lens element 440 is made of plastic material.

The fifth lens element 450 with positive refractive power has an object-side surface 451 being convex in a paraxial region thereof and an image-side surface 452 being concave in a paraxial region thereof, which are both aspheric, and the fifth lens element 450 is made of plastic material.

The sixth lens element 460 with positive refractive power has an object-side surface 461 being concave in a paraxial region thereof and an image-side surface 462 being convex in a paraxial region thereof, which are both aspheric, and the sixth lens element 460 is made of plastic material.

At least one of the first lens element 410, the second lens element 420, the third lens element 430, the fourth lens element 440, the fifth lens element 450, and the sixth lens element 460 has at least one inflection point.

The IR-cut filter 470 is made of glass, and will not affect the focal length of the image capturing lens system. The image sensor 490 is disposed on or near the image surface 480 of the image capturing lens system.

The detailed optical data of the fourth embodiment are shown in TABLE 9, and the aspheric surface data are shown in TABLE 10, wherein the units of the curvature radius, the thickness and the focal length are expressed in mm, and HFOV is half of the maximal field of view.

TABLE 9

(Embodiment 4)
f = 6.32 mm, Fno = 2.90, HFOV = 22.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.384 | | | | |
| 2 | Lens 1 | 1.664 | ASP | 0.788 | Plastic | 1.544 | 55.9 | 2.92 |
| 3 | | −29.631 | ASP | 0.041 | | | | |
| 4 | Lens 2 | 90.412 | ASP | 0.328 | Plastic | 1.634 | 23.8 | −5.13 |
| 5 | | 3.137 | ASP | 0.280 | | | | |
| 6 | Lens 3 | 11.756 | ASP | 0.718 | Plastic | 1.640 | 23.3 | 38.76 |
| 7 | | 21.818 | ASP | 0.171 | | | | |
| 8 | Lens 4 | −22.412 | ASP | 0.413 | Plastic | 1.535 | 55.7 | −8.87 |
| 9 | | 6.057 | ASP | 0.350 | | | | |
| 10 | Lens 5 | 10.549 | ASP | 0.882 | Plastic | 1.535 | 55.7 | 762.09 |
| 11 | | 10.513 | ASP | 1.279 | | | | |
| 12 | Lens 6 | −2.238 | ASP | 0.505 | Plastic | 1.535 | 55.7 | 14.92 |
| 13 | | −1.885 | ASP | 0.200 | | | | |
| 14 | IR-cut filter | Plano | | 0.210 | Glass | 1.517 | 64.2 | — |
| 15 | | Plano | | 0.208 | | | | |
| 16 | Image Surface | Plano | | — | | | | |

* Reference wavelength is d-line 587.6 nm

TABLE 10

Aspheric Coefficients

| Surface # | 2 | 3 | 4 | 5 | 6 | 7 |
|---|---|---|---|---|---|---|
| k = | −5.8765E+00 | 9.0000E+01 | 9.0000E+01 | 7.7467E+00 | 9.0000E+01 | 8.5616E+01 |
| A4 = | 1.5359E−01 | −1.0717E−01 | −1.5991E−01 | −1.7429E−01 | −1.5578E−01 | −1.7089E−01 |
| A6 = | −9.4281E−02 | 3.5098E−01 | 5.2872E−01 | 3.5819E−01 | 1.9886E−01 | 3.2396E−01 |
| A8 = | 6.5022E−02 | −5.1783E−01 | −7.6020E−01 | −3.7535E−01 | −2.1567E−02 | −1.5060E−01 |
| A10 = | −2.7141E−02 | 3.9668E−01 | 6.1101E−01 | 2.2691E−01 | 1.6967E−01 | −6.0022E−02 |
| A12 = | 4.5957E−03 | −1.5932E−01 | −2.6370E−01 | 8.8617E−02 | −2.1662E−03 | 2.4063E−01 |
| A14 = | −7.1283E−04 | 2.5414E−02 | 4.5447E−02 | −1.4623E−01 | −2.2241E−02 | −1.3027E−01 |

| Surface # | 8 | 9 | 10 | 11 | 12 | 13 |
|---|---|---|---|---|---|---|
| k = | 6.7513E+01 | −4.7021E+01 | 3.9300E+01 | 3.2532E+01 | 1.0545E−01 | −7.0916E+00 |
| A4 = | −1.9152E−01 | −1.3449E−01 | −2.3191E−01 | −1.2605E−01 | −8.5414E−02 | −1.2063E−01 |
| A6 = | 4.8989E−01 | 4.0293E−01 | 1.6480E−01 | 7.7041E−02 | 1.0368E−01 | 8.8047E−02 |
| A8 = | −5.5655E−01 | −5.6136E−01 | −9.7465E−02 | −5.5345E−02 | −6.0809E−02 | −4.0860E−02 |
| A10 = | 2.7948E−01 | 3.9916E−01 | 2.1709E−02 | 3.4856E−02 | 1.9119E−02 | 9.7503E−03 |
| A12 = | 3.3097E−02 | −1.5391E−01 | −5.1987E−03 | −1.4945E−02 | −2.9718E−03 | −1.1899E−03 |
| A14 = | −5.6130E−02 | 2.4890E−02 | −1.2042E−03 | 3.5269E−03 | 1.9303E−04 | 4.9329E−05 |
| A16 = | | | | −3.5478E−04 | −1.7086E−06 | 2.5661E−06 |

In the 4th embodiment, the equation of the aspheric surface profiles of the aforementioned lens elements is the same as the equation of the 1st embodiment. Also, the definitions of these parameters shown in Table 11 below are the same as those stated in the 1st embodiment with corresponding values for the 4th embodiment, so an explanation in this regard will not be provided again.

Moreover, these parameters can be calculated from Table 9 and Table 10 and satisfy the conditions stated in Table 11.

TABLE 11

4$^{th}$ Embodiment

| f [mm] | 6.32 | (f/R11) + (f/R12) | −6.18 |
|---|---|---|---|
| Fno | 2.90 | f4/|f3| | −0.23 |
| HFOV [deg.] | 22.7 | f/f4 | −0.71 |
| Nmax | 1.640 | T56/(ΣAT − T56) | 1.52 |
| (V2 + V3 + V5)/V4 | 1.85 | tan(2 * HFOV) | 1.01 |
| CT4/CT5 | 0.47 | SAG62/CT6 | −2.66 |
| T56/CT5 | 1.45 | SD/TD | 0.93 |

TABLE 11-continued

4$^{th}$ Embodiment

| f/R1 | 3.80 | BL/TD | 0.11 |
|---|---|---|---|
| R4/R3 | 0.03 | TL [mm] | 6.37 |

5th Embodiment

Figure 5A:
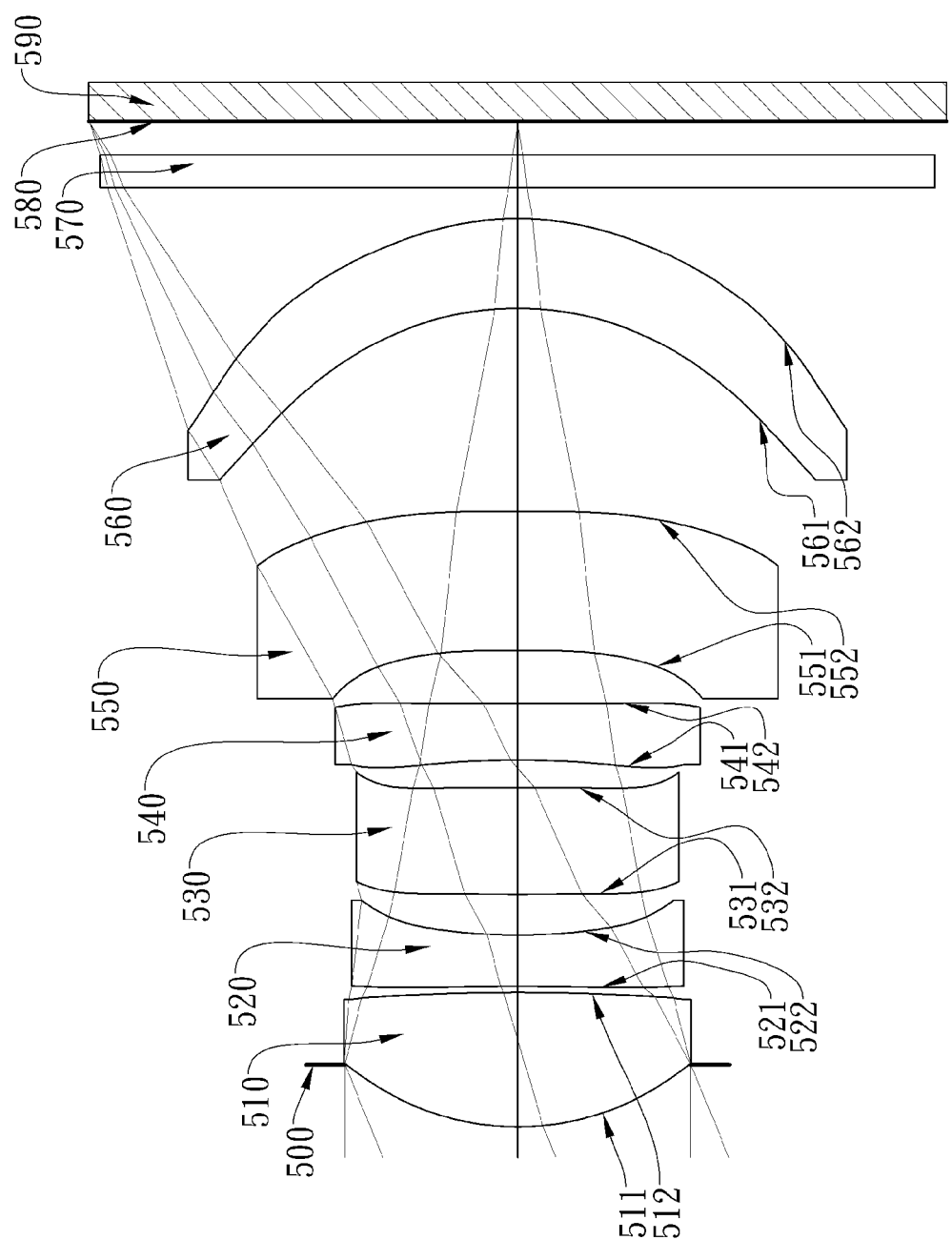
FIG. 5A is a schematic view of an image capturing apparatus according to the 5th embodiment of the present disclosure.
Figure 5B:
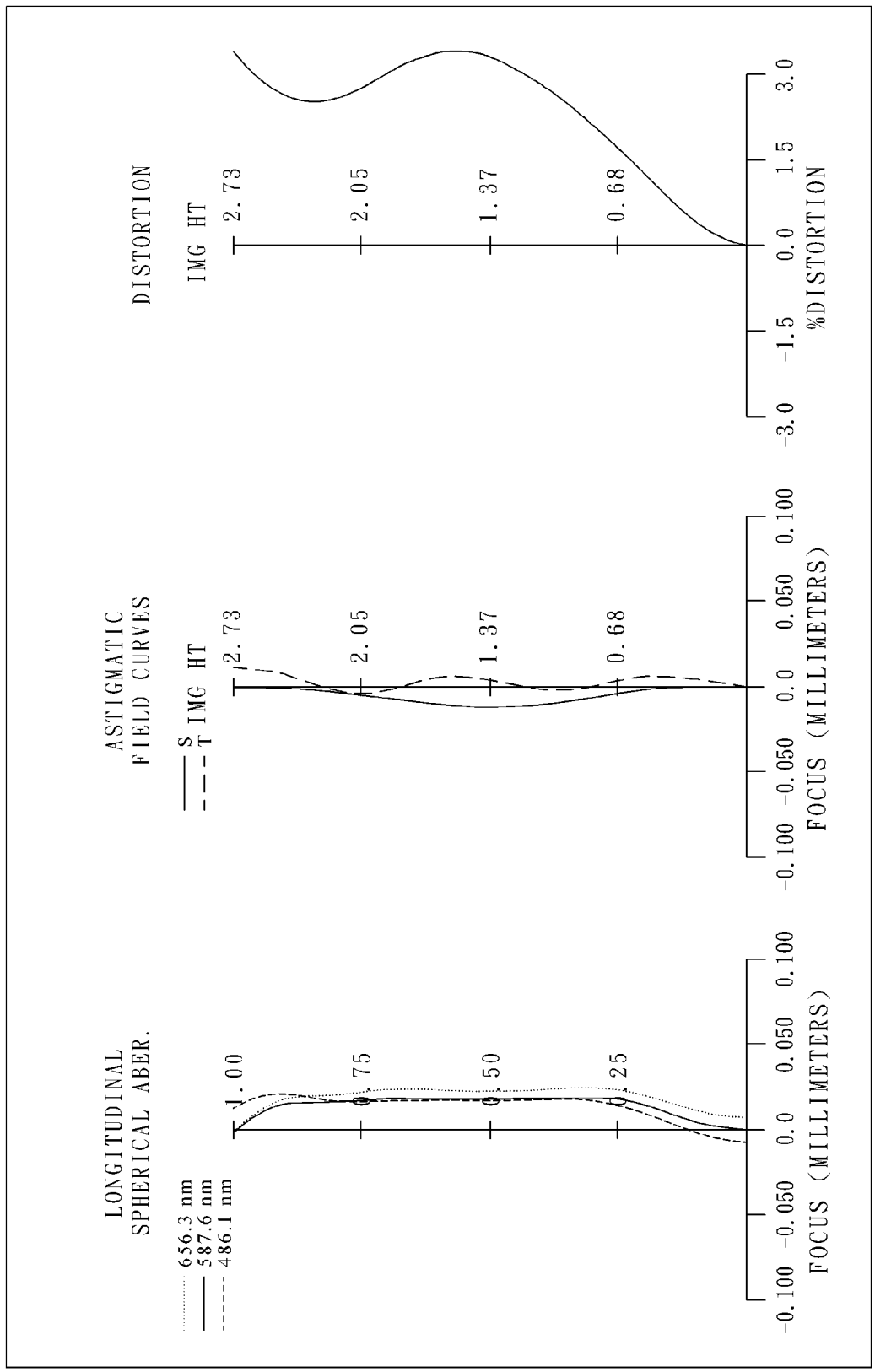
FIG. 5B shows longitudinal spherical aberration curves, astigmatic field curves and a distortion curve of the image capturing apparatus according to the 5th embodiment.

FIG. 5A is a schematic view of an image capturing apparatus according to the 5th embodiment of the present disclosure. FIG. 5B shows, in order from left to right, longitudinal spherical aberration curves, astigmatic field curves and a distortion curve of the image capturing apparatus according to the 5th embodiment.

In FIG. 5A, the image capturing apparatus includes an image capturing lens system (not otherwise herein labeled) of the present disclosure and an image sensor 590. The image capturing lens system includes, in order from an object side to an image side, an aperture stop 500, a first lens element 510, a second lens element 520, a third lens element 530, a fourth lens element 540, a fifth lens element 550, a sixth lens element 560, an IR-cut filter 570 and an image surface 580, wherein an axial air gap is arranged between every two adjacent lens elements.

The first lens element 510 with positive refractive power has an object-side surface 511 being convex in a paraxial region thereof and an image-side surface 512 being convex in a paraxial region thereof, which are both aspheric, and the first lens element 510 is made of plastic material.

The second lens element 520 with negative refractive power has an object-side surface 521 being concave in a paraxial region thereof and an image-side surface 522 being concave in a paraxial region thereof, which are both aspheric, and the second lens element 520 is made of plastic material.

The third lens element 530 with positive refractive power has an object-side surface 531 being convex in a paraxial region thereof and an image-side surface 532 being concave in a paraxial region thereof, which are both aspheric, and the third lens element 530 is made of plastic material.

The fourth lens element 540 with negative refractive power has an object-side surface 541 being concave in a paraxial region thereof and an image-side surface 542 being concave in a paraxial region thereof, which are both aspheric, and the fourth lens element 540 is made of plastic material.

The fifth lens element 550 with negative refractive power has an object-side surface 551 being concave in a paraxial region thereof and an image-side surface 552 being convex in a paraxial region thereof, which are both aspheric, and the fifth lens element 550 is made of plastic material.

The sixth lens element 560 with positive refractive power has an object-side surface 561 being concave in a paraxial region thereof and an image-side surface 562 being convex in a paraxial region thereof, which are both aspheric, and the sixth lens element 560 is made of plastic material.

At least one of the first lens element 510, the second lens element 520, the third lens element 530, the fourth lens element 540, the fifth lens element 550, and the sixth lens element 560 has at least one inflection point.

The IR-cut filter 570 is made of glass, and will not affect the focal length of the image capturing lens system. The image sensor 590 is disposed on or near the image surface 580 of the image capturing lens system.

The detailed optical data of the fifth embodiment are shown in TABLE 12, and the aspheric surface data are shown in TABLE 13, wherein the units of the curvature radius, the thickness and the focal length are expressed in mm, and HFOV is half of the maximal field of view.

TABLE 12

(Embodiment 5)
f = 6.40 mm, Fno = 2.90, HFOV = 22.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.399 | | | | |
| 2 | Lens 1 | 1.663 | ASP | 0.858 | Plastic | 1.544 | 55.9 | 2.87 |
| 3 | | −20.891 | ASP | 0.038 | | | | |
| 4 | Lens 2 | −286.093 | ASP | 0.330 | Plastic | 1.634 | 23.8 | −4.91 |
| 5 | | 3.146 | ASP | 0.258 | | | | |
| 6 | Lens 3 | 11.876 | ASP | 0.684 | Plastic | 1.640 | 23.3 | 30.93 |
| 7 | | 29.035 | ASP | 0.175 | | | | |
| 8 | Lens 4 | −8.061 | ASP | 0.363 | Plastic | 1.535 | 55.7 | −11.43 |
| 9 | | 25.750 | ASP | 0.340 | | | | |
| 10 | Lens 5 | −20.080 | ASP | 0.888 | Plastic | 1.535 | 55.7 | −50.04 |
| 11 | | −81.566 | ASP | 1.295 | | | | |
| 12 | Lens 6 | −2.191 | ASP | 0.574 | Plastic | 1.535 | 55.7 | 19.78 |
| 13 | | −1.981 | ASP | 0.200 | | | | |
| 14 | IR-cut filter | Plano | | 0.210 | Glass | 1.517 | 64.2 | — |
| 15 | | Plano | | 0.211 | | | | |
| 16 | Image Surface | Plano | | — | | | | |

* Reference wavelength is d-line 587.6 nm

TABLE 13

Aspheric Coefficients

| Surface # | 2 | 3 | 4 | 5 | 6 | 7 |
|---|---|---|---|---|---|---|
| k = | −5.9045E+00 | −4.4218E+01 | −9.0000E+01 | 7.7142E+00 | 9.0000E+01 | 4.4987E+01 |
| A4 = | 1.5460E−01 | −1.0747E−01 | −1.5866E−01 | −1.7228E−01 | −1.5535E−01 | −1.6783E−01 |
| A6 = | −9.4454E−02 | 3.5106E−01 | 5.2869E−01 | 3.6196E−01 | 2.0296E−01 | 3.2392E−01 |
| A8 = | 6.4904E−02 | −5.1795E−01 | −7.6010E−01 | −3.7230E−01 | −2.1467E−02 | −1.4857E−01 |
| A10 = | −2.7069E−02 | 3.9677E−01 | 6.1085E−01 | 2.2842E−01 | 1.7138E−02 | −5.8141E−02 |
| A12 = | 4.7009E−03 | −1.5932E−01 | −2.6379E−01 | 8.9464E−02 | −1.8339E−03 | 2.4198E−01 |
| A14 = | −6.3844E−04 | 2.5324E−02 | 4.5452E−02 | −1.4580E−01 | −2.1839E−02 | −1.2917E−01 |

| Surface # | 8 | 9 | 10 | 11 | 12 | 13 |
|---|---|---|---|---|---|---|
| k = | −1.7079E+01 | 7.8141E+01 | −9.0000E+01 | −9.0000E+01 | 9.4284E−02 | −8.8964E+00 |
| A4 = | −1.8348E−01 | −1.3526E−01 | −2.1676E−01 | −1.1288E−01 | −8.6239E−02 | −1.2045E−01 |
| A6 = | 4.9498E−01 | 4.0617E−01 | 1.6920E−01 | 7.7021E−02 | 1.0171E−01 | 8.7791E−02 |
| A8 = | −5.5496E−01 | −5.6188E−01 | −1.0106E−01 | −5.5088E−02 | −6.0652E−02 | −4.0871E−02 |

TABLE 13-continued

| Aspheric Coefficients | | | | | | |
|---|---|---|---|---|---|---|
| A10 = | 2.8088E−01 | 3.9907E−01 | 2.1522E−02 | 3.4946E−02 | 1.9136E−02 | 9.7521E−03 |
| A12 = | 3.4737E−02 | −1.5382E−01 | −5.0748E−03 | −1.4933E−02 | −2.9651E−03 | −1.1901E−03 |
| A14 = | −5.4281E−02 | 2.4929E−02 | −6.6389E−04 | 3.5282E−03 | 1.9584E−04 | 4.9101E−05 |
| A16 = | | | | −3.5410E−04 | −8.1719E−07 | 2.4935E−06 |

In the 5th embodiment, the equation of the aspheric surface profiles of the aforementioned lens elements is the same as the equation of the 1st embodiment. Also, the definitions of these parameters shown in Table 14 below are the same as those stated in the 1st embodiment with corresponding values for the 5th embodiment, so an explanation in this regard will not be provided again.

Moreover, these parameters can be calculated from Table 12 and Table 13 and satisfy the conditions stated in Table 14.

TABLE 14

| Embodiment 5 | | | |
|---|---|---|---|
| f [mm] | 6.40 | (f/R11) + (f/R12) | −6.16 |
| Fno | 2.90 | f4/|f3| | −0.37 |
| HFOV [deg.] | 22.3 | f/f4 | −0.56 |
| Nmax | 1.640 | T56/(ΣAT − T56) | 1.60 |
| (V2 + V3 + V5)/V4 | 1.85 | tan(2 * HFOV) | 0.99 |
| CT4/CT5 | 0.41 | SAG62/CT6 | −2.35 |
| T56/CT5 | 1.46 | SD/TD | 0.93 |
| f/R1 | 3.85 | BL/TD | 0.11 |
| R4/R3 | −0.01 | TL [mm] | 6.42 |

6th Embodiment

Figure 6A:
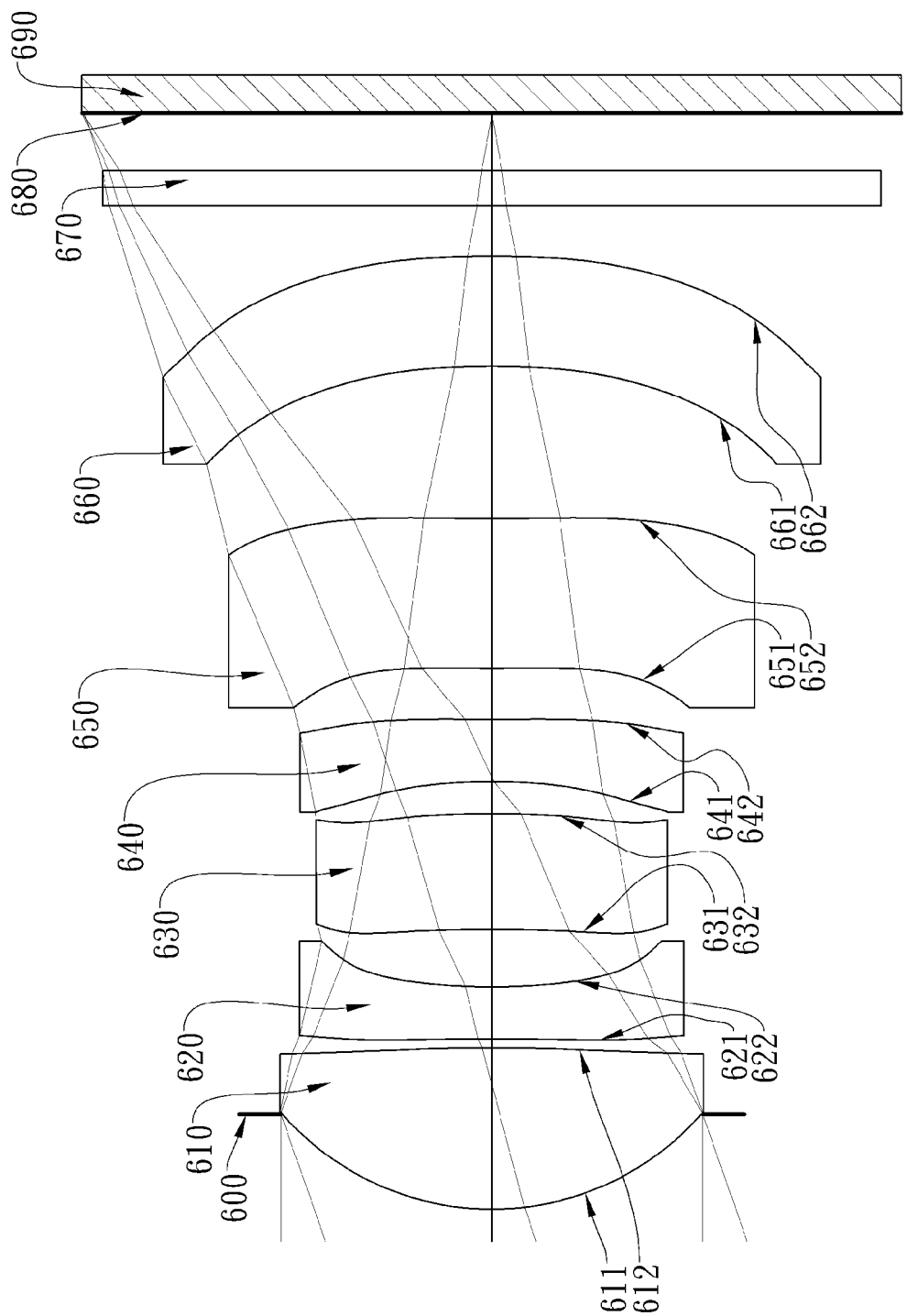
FIG. 6A is a schematic view of an image capturing apparatus according to the 6th embodiment of the present disclosure.
Figure 6B:
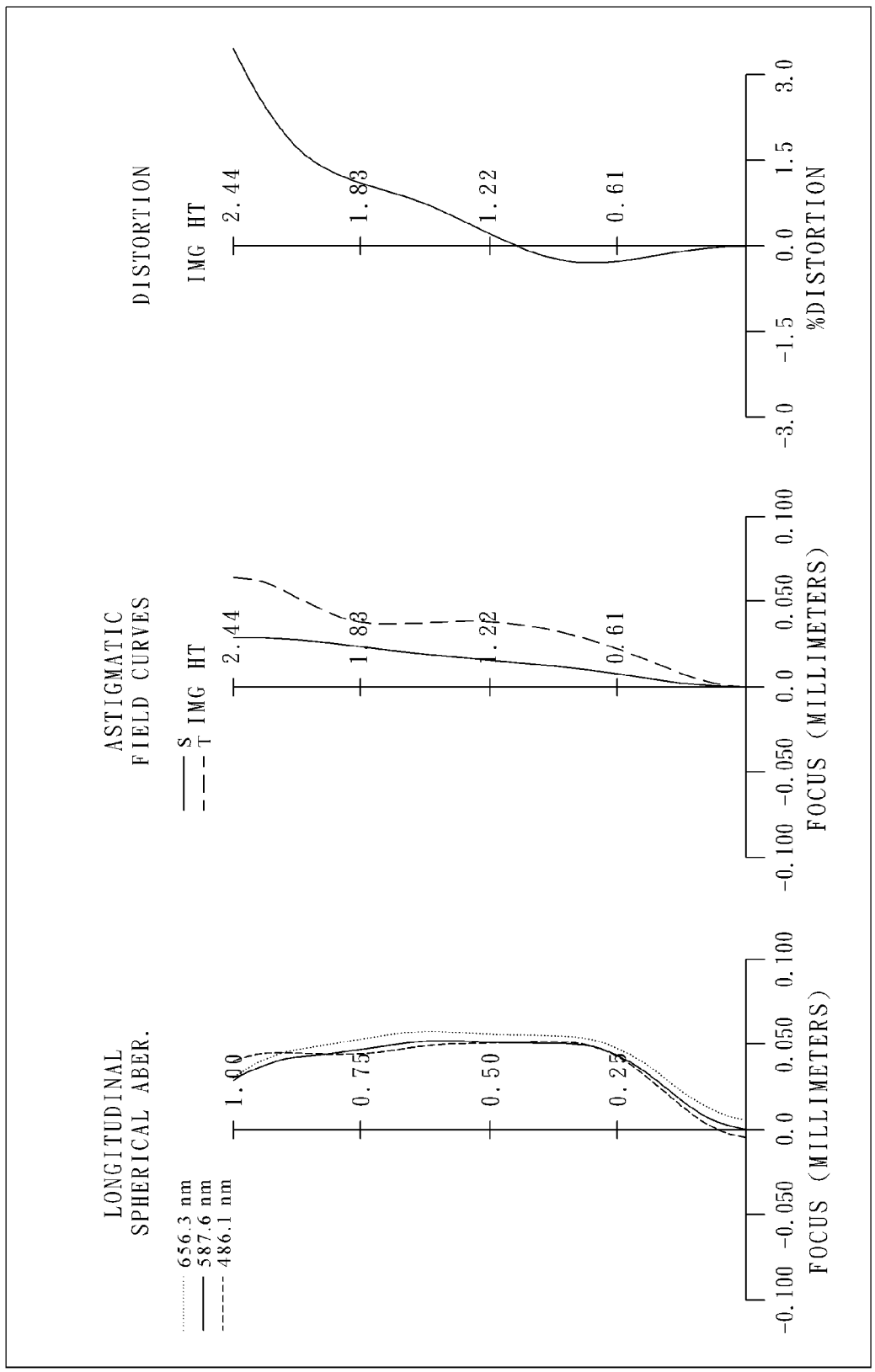
FIG. 6B shows longitudinal spherical aberration curves, astigmatic field curves and a distortion curve of the image capturing apparatus according to the 6th embodiment.

FIG. 6A is a schematic view of an image capturing apparatus according to the 6th embodiment of the present disclosure. FIG. 6B shows, in order from left to right, longitudinal spherical aberration curves, astigmatic field curves and a distortion curve of the image capturing apparatus according to the 6th embodiment.

In FIG. 6A, the image capturing apparatus includes an image capturing lens system (not otherwise herein labeled) of the present disclosure and an image sensor 690. The image capturing lens system includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image surface 680, wherein an axial air gap is arranged between every two adjacent lens elements.

The first lens element 610 with positive refractive power has an object-side surface 611 being convex in a paraxial region thereof and an image-side surface 612 being convex in a paraxial region thereof, which are both aspheric, and the first lens element 610 is made of plastic material.

The second lens element 620 with negative refractive power has an object-side surface 621 being concave in a paraxial region thereof and an image-side surface 622 being concave in a paraxial region thereof, which are both aspheric, and the second lens element 620 is made of plastic material.

The third lens element 630 with positive refractive power has an object-side surface 631 being concave in a paraxial region thereof and an image-side surface 632 being convex in a paraxial region thereof, which are both aspheric, and the third lens element 630 is made of plastic material.

The fourth lens element 640 with negative refractive power has an object-side surface 641 being concave in a paraxial region thereof and an image-side surface 642 being concave in a paraxial region thereof, which are both aspheric, and the fourth lens element 640 is made of plastic material.

The fifth lens element 650 with negative refractive power has an object-side surface 651 being convex in a paraxial region thereof and an image-side surface 652 being concave in a paraxial region thereof, which are both aspheric, and the fifth lens element 650 is made of plastic material.

The sixth lens element 660 with negative refractive power has an object-side surface 661 being concave in a paraxial region thereof and an image-side surface 662 being convex in a paraxial region thereof, which are both aspheric, and the sixth lens element 660 is made of plastic material.

At least one of the first lens element 610, the second lens element 620, the third lens element 630, the fourth lens element 640, the fifth lens element 650, and the sixth lens element 660 has at least one inflection point.

The IR-cut filter 670 is made of glass, and will not affect the focal length of the image capturing lens system. The image sensor 690 is disposed on or near the image surface 680 of the image capturing lens system.

The detailed optical data of the sixth embodiment are shown in TABLE 15, and the aspheric surface data are shown in TABLE 16, wherein the units of the curvature radius, the thickness and the focal length are expressed in mm, and HFOV is half of the maximal field of view.

TABLE 15

| (Embodiment 6) f = 6.64 mm, Fno = 2.65, HFOV = 19.3 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.565 | | | | |
| 2 | Lens 1 | 1.645 | ASP | 0.959 | Plastic | 1.544 | 55.9 | 2.80 |
| 3 | | −16.378 | ASP | 0.050 | | | | |
| 4 | Lens 2 | −327.261 | ASP | 0.312 | Plastic | 1.640 | 23.3 | −5.21 |
| 5 | | 3.367 | ASP | 0.342 | | | | |
| 6 | Lens 3 | −20.548 | ASP | 0.688 | Plastic | 1.640 | 23.3 | 41.92 |

TABLE 15-continued (Embodiment 6)
f = 6.64 mm, Fno = 2.65, HFOV = 19.3 deg.

| Surface # | | Curvature Radius | Thickness | Material | Index | Abbe # | Focal Length |
|---|---|---|---|---|---|---|---|
| 7 | | −11.786 ASP | 0.192 | | | | |
| 8 | Lens 4 | −4.629 ASP | 0.369 | Plastic | 1.535 | 55.7 | −6.87 |
| 9 | | 18.302 ASP | 0.305 | | | | |
| 10 | Lens 5 | 14.846 ASP | 0.889 | Plastic | 1.583 | 30.2 | −107.51 |
| 11 | | 11.740 ASP | 0.905 | | | | |
| 12 | Lens 6 | −5.890 ASP | 0.655 | Plastic | 1.535 | 55.7 | −34.28 |
| 13 | | −9.012 ASP | 0.300 | | | | |
| 14 | IR-cut filter | Plano | 0.210 | Glass | 1.517 | 64.2 | — |
| 15 | | Plano | 0.343 | | | | |
| 16 | Image Surface | Plano | — | | | | |

* Reference wavelength is d-line 587.6 nm

TABLE 16

Aspheric Coefficients

| Surface # | 2 | 3 | 4 | 5 | 6 | 7 |
|---|---|---|---|---|---|---|
| k = | −6.0856E+00 | −6.3201E+01 | 9.0000E+01 | 8.3036E+00 | −3.5874E−01 | 7.2581E+01 |
| A4 = | 1.6354E−01 | −1.0258E−01 | −1.5336E−01 | −1.2820E−01 | −1.3432E−01 | −2.1663E−01 |
| A6 = | −9.5112E−02 | 3.5370E−01 | 5.3225E−01 | 3.4697E−01 | 1.9922E−01 | 3.3638E−01 |
| A8 = | 6.4810E−02 | −5.1555E−01 | −7.5979E−01 | −3.6554E−01 | −2.5834E−02 | −1.4447E−01 |
| A10 = | −2.6287E−02 | 3.9813E−01 | 6.1084E−01 | 2.3945E−01 | 2.0638E−02 | −6.8415E−02 |
| A12 = | 5.4449E−03 | −1.5873E−01 | −2.6359E−01 | 9.9876E−02 | 2.2134E−03 | 2.3280E−01 |
| A14 = | −2.1812E−04 | 2.5505E−02 | 4.5761E−02 | −1.3693E−01 | −2.0233E−02 | −1.3067E−01 |

| Surface # | 8 | 9 | 10 | 11 | 12 | 13 |
|---|---|---|---|---|---|---|
| k = | 1.6923E+01 | 9.0000E+01 | 9.0000E+01 | −1.5797E+00 | 3.8645E+00 | −2.1027E+01 |
| A4 = | −2.9040E−01 | −2.1927E−01 | −2.1458E−01 | −1.0822E−01 | −1.1101E−01 | −1.2081E−01 |
| A6 = | 5.9010E−01 | 4.0595E−01 | 1.3552E−01 | 7.3259E−02 | 1.0273E−01 | 8.8386E−02 |
| A8 = | −6.0034E−01 | −5.4914E−01 | −1.0528E−01 | −5.5572E−02 | −6.0834E−02 | −4.0606E−02 |
| A10 = | 3.0872E−01 | 4.0317E−01 | 2.9096E−02 | 3.4915E−02 | 1.9007E−02 | 9.7617E−03 |
| A12 = | 5.3265E−02 | −1.5230E−01 | −8.9000E−04 | −1.4939E−02 | −3.0031E−03 | −1.1948E−03 |
| A14 = | −7.3259E−02 | 2.5999E−02 | 4.6334E−04 | 3.5209E−03 | 1.8567E−04 | 4.9003E−05 |
| A16 = | | | | −3.6027E−04 | −3.1018E−06 | 2.9172E−06 |

In the 6th embodiment, the equation of the aspheric surface profiles of the aforementioned lens elements is the same as the equation of the 1st embodiment. Also, the definitions of these parameters shown in Table 17 below are the same as those stated in the 1st embodiment with corresponding values for the 6th embodiment, so an explanation in this regard will not be provided again.

Moreover, these parameters can be calculated from Table 15 and Table 16 and satisfy the conditions stated in Table 17.

TABLE 17

6th Embodiment

| f [mm] | 6.64 | (f/R11) + (f/R12) | −1.86 |
|---|---|---|---|
| Fno | 2.65 | f4/\|f3\| | −0.16 |
| HFOV [deg.] | 19.3 | f/f4 | −0.97 |
| Nmax | 1.640 | T56/(ΣAT − T56) | 1.02 |
| (V2 + V3 + V5)/V4 | 1.38 | tan(2 * HFOV) | 0.80 |
| CT4/CT5 | 0.42 | SAG62/CT6 | −1.10 |
| T56/CT5 | 1.02 | SD/TD | 0.90 |
| f/R1 | 4.04 | BL/TD | 0.15 |
| R4/R3 | −0.01 | TL [mm] | 6.52 |

7th Embodiment

Figure 7A:
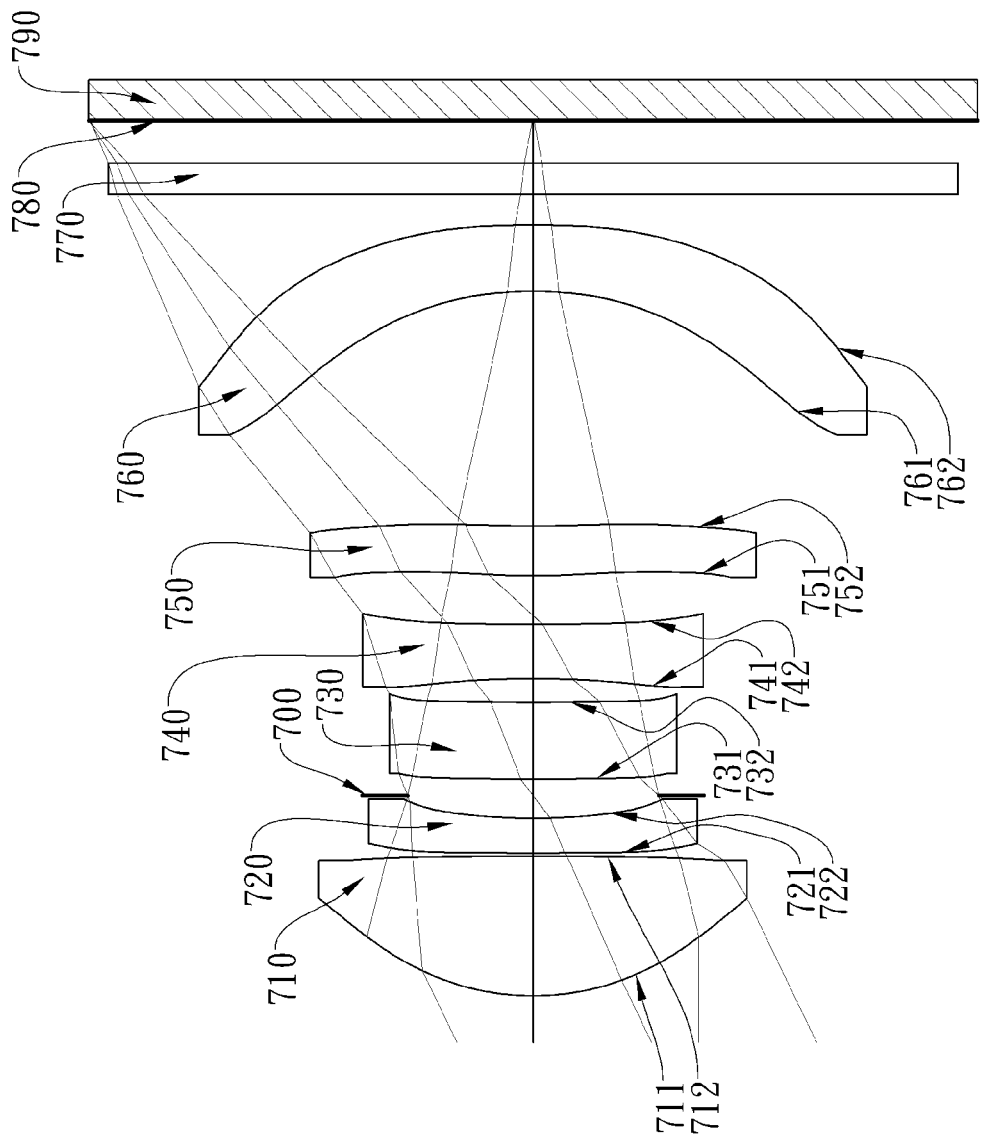
FIG. 7A is a schematic view of an image capturing apparatus according to the 7th embodiment of the present disclosure.
Figure 7B:
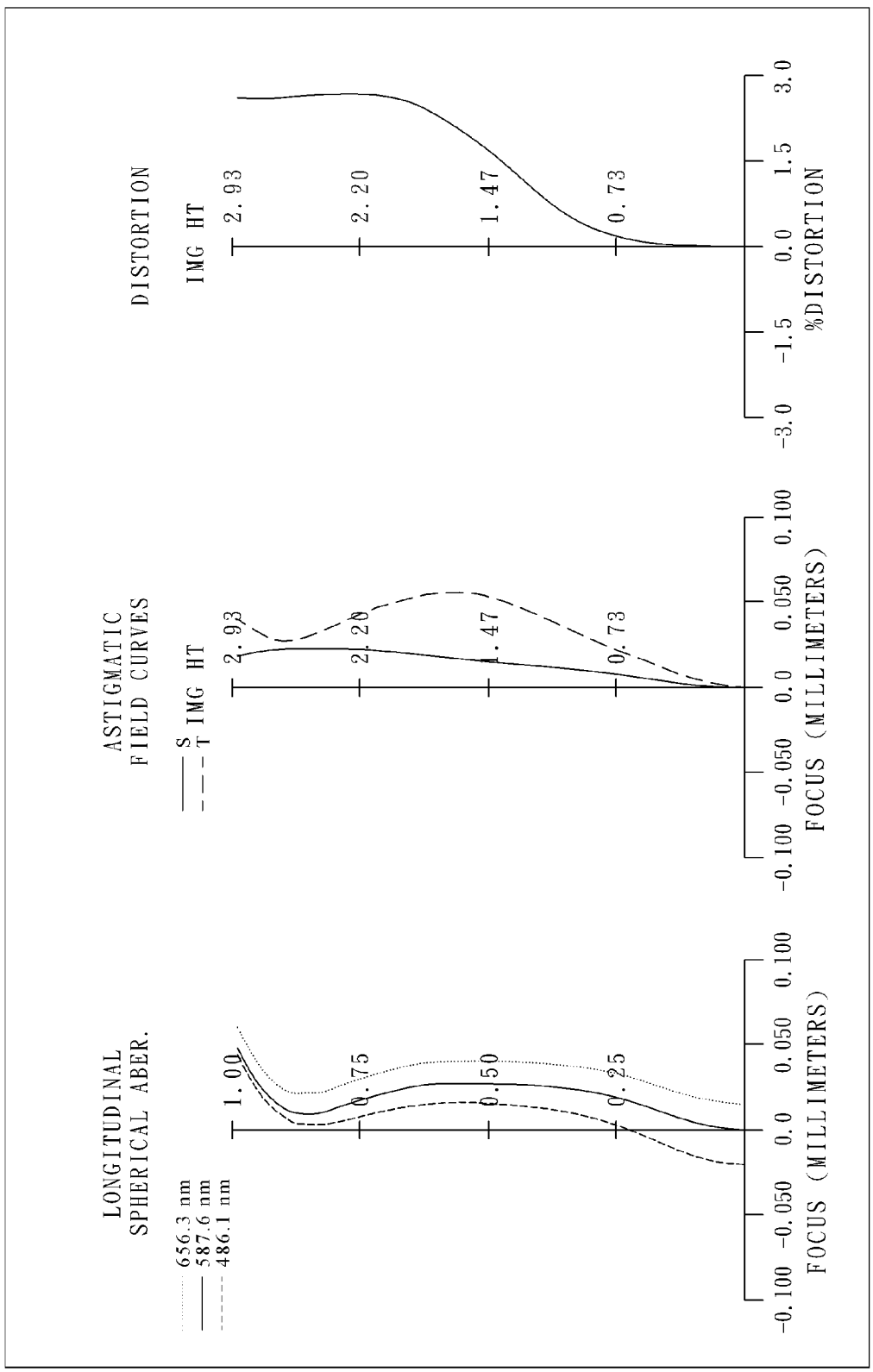
FIG. 7B shows longitudinal spherical aberration curves, astigmatic field curves and a distortion curve of the image capturing apparatus according to the 7th embodiment.

FIG. 7A is a schematic view of an image capturing apparatus according to the 7th embodiment of the present disclosure. FIG. 7B shows, in order from left to right, longitudinal spherical aberration curves, astigmatic field curves and a distortion curve of the image capturing apparatus according to the 7th embodiment.

In FIG. 7A, the image capturing apparatus includes an image capturing lens system (not otherwise herein labeled) of the present disclosure and an image sensor 790. The image capturing lens system includes, in order from an object side to an image side, a first lens element 710, a second lens element 720, an aperture stop 700, a third lens element 730, a fourth lens element 740, a fifth lens element 750, a sixth lens element 760, an IR-cut filter 770 and an image surface 780, wherein an axial air gap is arranged between every two adjacent lens elements.

The first lens element 710 with positive refractive power has an object-side surface 711 being convex in a paraxial region thereof and an image-side surface 712 being concave in a paraxial region thereof, which are both aspheric, and the first lens element 710 is made of plastic material.

The second lens element 720 with negative refractive power has an object-side surface 721 being convex in a paraxial region thereof and an image-side surface 722 being concave in a paraxial region thereof, which are both aspheric, and the second lens element 720 is made of plastic material.

The third lens element 730 with negative refractive power has an object-side surface 731 being convex in a paraxial region thereof and an image-side surface 732 being concave in a paraxial region thereof, which are both aspheric, and the third lens element 730 is made of plastic material.

The fourth lens element 740 with negative refractive power has an object-side surface 741 being concave in a paraxial region thereof and an image-side surface 742 being concave in a paraxial region thereof, which are both aspheric, and the fourth lens element 740 is made of plastic material.

The fifth lens element 750 with positive refractive power has an object-side surface 751 being convex in a paraxial region thereof and an image-side surface 752 being concave in a paraxial region thereof, which are both aspheric, and the fifth lens element 750 is made of plastic material.

The sixth lens element 760 with negative refractive power has an object-side surface 761 being concave in a paraxial region thereof and an image-side surface 762 being convex in a paraxial region thereof, which are both aspheric, and the sixth lens element 760 is made of plastic material.

At least one of the first lens element 710, the second lens element 720, the third lens element 730, the fourth lens element 740, the fifth lens element 750, and the sixth lens element 760 has at least one inflection point.

The IR-cut filter 770 is made of glass, and will not affect the focal length of the image capturing lens system. The image sensor 790 is disposed on or near the image surface 780 of the image capturing lens system.

The detailed optical data of the seventh embodiment are shown in TABLE 18, and the aspheric surface data are shown in TABLE 19, wherein the units of the curvature radius, the thickness and the focal length are expressed in mm, and HFOV is half of the maximal field of view.

TABLE 18

(Embodiment 7)
f = 5.92 mm, Fno = 2.70, HFOV = 25.7 deg

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 1.678 | ASP | 0.923 | Plastic | 1.544 | 55.9 | 3.15 |
| 2 |  | 60.373 | ASP | 0.020 |  |  |  |  |
| 3 | Lens 2 | 17.500 | ASP | 0.230 | Plastic | 1.650 | 21.4 | −7.02 |
| 4 |  | 3.599 | ASP | 0.151 |  |  |  |  |
| 5 | Ape. Stop | Plano |  | 0.108 |  |  |  |  |
| 6 | Lens 3 | 10.602 | ASP | 0.509 | Plastic | 1.650 | 21.4 | −1105.18 |
| 7 |  | 10.250 | ASP | 0.156 |  |  |  |  |
| 8 | Lens 4 | −9.580 | ASP | 0.358 | Plastic | 1.544 | 55.9 | −10.18 |
| 9 |  | 13.294 | ASP | 0.322 |  |  |  |  |
| 10 | Lens 5 | 4.350 | ASP | 0.328 | Plastic | 1.639 | 23.5 | 16.45 |
| 11 |  | 7.201 | ASP | 1.552 |  |  |  |  |
| 12 | Lens 6 | −2.683 | ASP | 0.439 | Plastic | 1.535 | 55.7 | −7.74 |
| 13 |  | −8.057 | ASP | 0.200 |  |  |  |  |
| 14 | IR-cut filter | Plano |  | 0.210 | Glass | 1.517 | 64.2 | — |
| 15 |  | Plano |  | 0.281 |  |  |  |  |
| 16 | Image Surface | Plano |  | — |  |  |  |  |

\* Reference wavelength is d-line 587.6 nm

TABLE 19

Aspheric Coefficients

| Surface # | 1 | 2 | 3 | 4 | 6 | 7 |
|---|---|---|---|---|---|---|
| k = | −6.0017E+00 | −2.5214E+01 | 8.8296E+01 | 7.9430E+00 | −7.4486E+01 | 8.5444E+01 |
| A4 = | 1.5289E−01 | −1.1422E−01 | −1.5622E−01 | −1.3370E−01 | −1.3215E−01 | −1.9751E−01 |
| A6 = | −9.5741E−02 | 3.4446E−01 | 5.3177E−01 | 3.5730E−01 | 2.0105E−01 | 3.1936E−01 |
| A8 = | 6.3085E−02 | −5.2642E−01 | −7.6160E−01 | −3.7104E−01 | −2.4703E−02 | −1.5359E−01 |
| A10 = | −2.3209E−02 | 4.1068E−01 | 6.1589E−01 | 2.3613E−01 | 1.1372E−01 | −6.1386E−02 |
| A12 = | −1.9663E−04 | −1.5993E−01 | −2.5519E−01 | 9.7561E−02 | −1.9883E−03 | 2.3690E−01 |
| A14 = | 1.3046E−03 | 2.4861E−02 | 4.0175E−02 | −1.4707E−01 | −2.1109E−02 | −1.3530E−01 |

| Surface # | 8 | 9 | 10 | 11 | 12 | 13 |
|---|---|---|---|---|---|---|
| k = | −8.4656E+01 | −1.7966E+01 | −6.2768E+00 | −4.5916E+00 | 1.4708E−01 | −6.8796E+00 |
| A4 = | −1.9802E−01 | −1.1518E−01 | −1.8892E−01 | −1.2739E−01 | −1.0821E−01 | −1.2476E−01 |
| A6 = | 4.8022E−01 | 4.1081E−01 | 1.7371E−01 | 9.3786E−02 | 1.0694E−01 | 9.0623E−02 |
| A8 = | −5.5720E−01 | −5.5767E−01 | −9.3445E−02 | −5.5451E−02 | −6.1190E−02 | −4.0519E−02 |
| A10 = | 2.7995E−01 | 4.0188E−01 | 2.6532E−02 | 3.3766E−02 | 1.9177E−02 | 9.7488E−03 |
| A12 = | 3.6540E−02 | −1.5265E−01 | −3.0836E−03 | −1.5100E−02 | −2.9566E−03 | −1.1970E−03 |
| A14 = | −5.0443E−02 | 2.5176E−02 | −3.8116E−04 | 3.5301E−03 | 1.9341E−04 | 4.7192E−05 |
| A16 = |  |  |  | −3.3843E−04 | −2.3956E−06 | 2.1709E−06 |

In the 7th embodiment, the equation of the aspheric surface profiles of the aforementioned lens elements is the same as the equation of the 1st embodiment. Also, the definitions of these parameters shown in Table 20 below are the same as those stated in the 1st embodiment with corresponding values for the 7th embodiment, so an explanation in this regard will not be provided again.

Moreover, these parameters can be calculated from Table 18 and Table 19 and satisfy the conditions stated in Table 20.

TABLE 20

| 7th Embodiment | | | |
|---|---|---|---|
| f [mm] | 5.92 | (f/R11) + (f/R12) | −2.94 |
| Fno | 2.70 | f4/\|f3\| | −0.01 |
| HFOV [deg.] | 25.7 | f/f4 | −0.58 |
| Nmax | 1.650 | T56/(ΣAT − T56) | 2.05 |
| (V2 + V3 + V5)/V4 | 1.18 | tan(2 * HFOV) | 1.25 |
| CT4/CT5 | 1.09 | SAG62/CT6 | −2.43 |
| T56/CT5 | 4.73 | SD/TD | 0.74 |
| f/R1 | 3.53 | BL/TD | 0.14 |
| R4/R3 | 0.21 | TL [mm] | 5.79 |

8th Embodiment

Figure 8A:
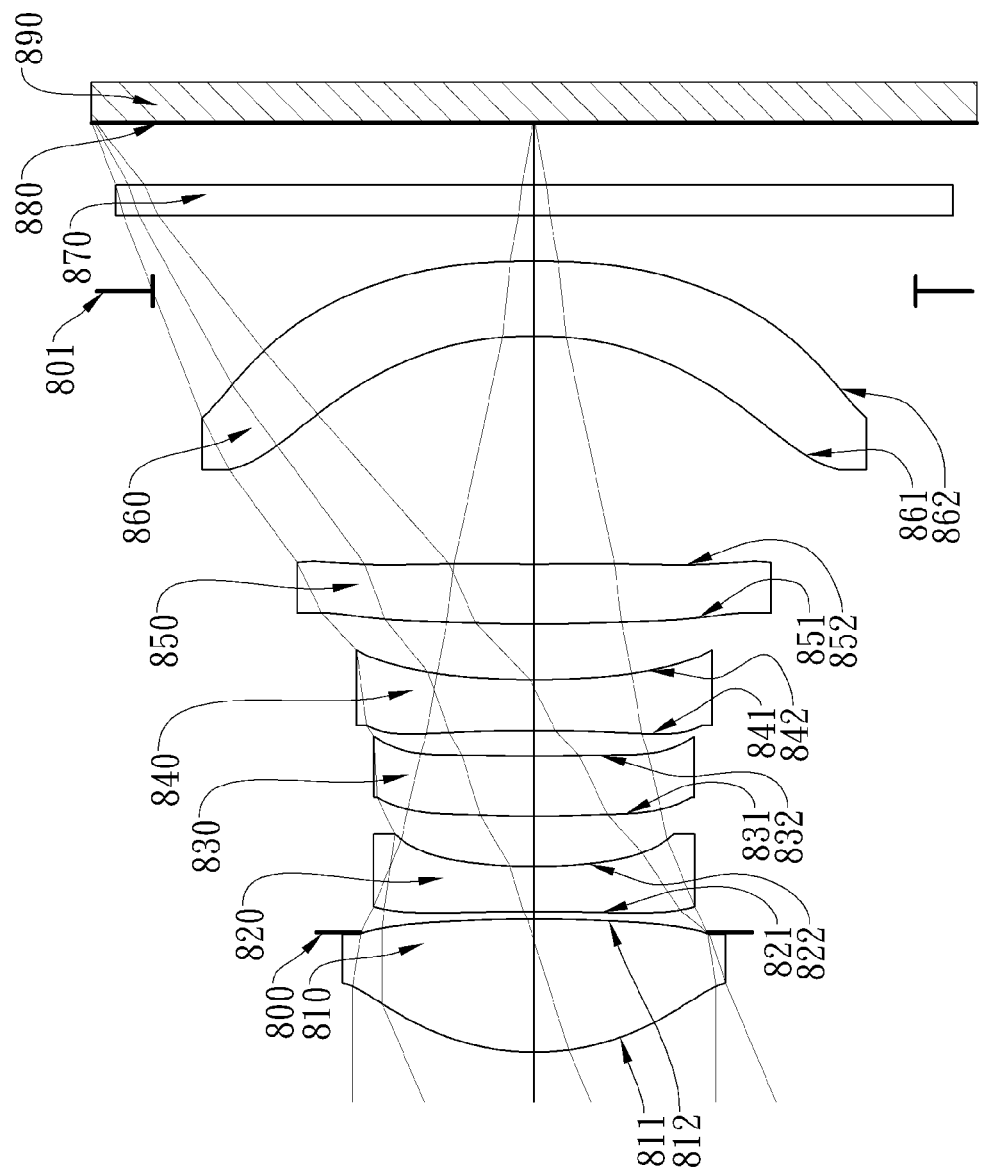
FIG. 8A is a schematic view of an image capturing apparatus according to the 8th embodiment of the present disclosure.
Figure 8B:
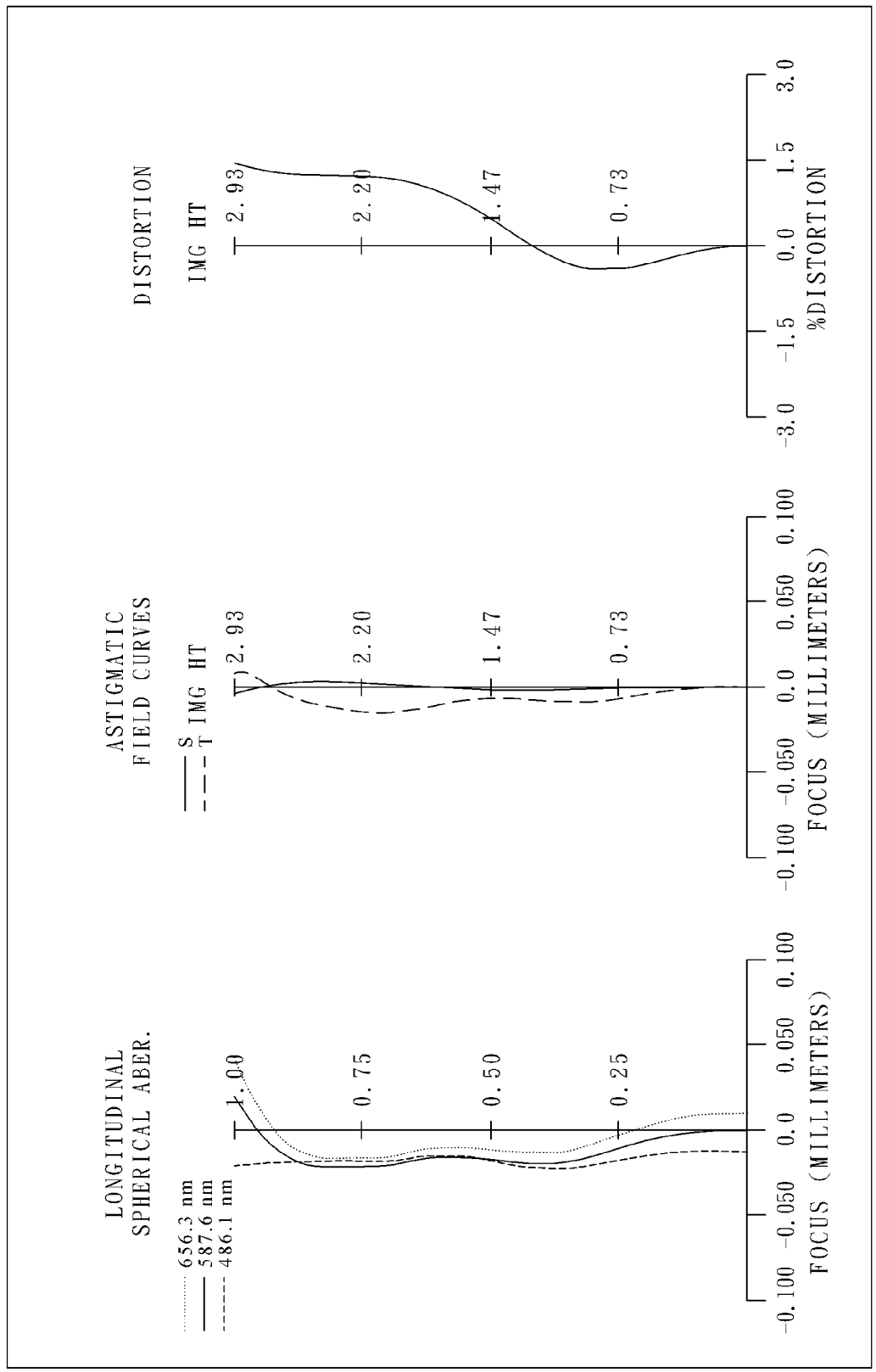
FIG. 8B shows longitudinal spherical aberration curves, astigmatic field curves and a distortion curve of the image capturing apparatus according to the 8th embodiment.

FIG. 8A is a schematic view of an image capturing apparatus according to the 8th embodiment of the present disclosure. FIG. 8B shows, in order from left to right, longitudinal spherical aberration curves, astigmatic field curves and a distortion curve of the image capturing apparatus according to the 8th embodiment.

In FIG. 8A, the image capturing apparatus includes an image capturing lens system (not otherwise herein labeled) of the present disclosure and an image sensor 890. The image capturing lens system includes, in order from an object side to an image side, a first lens element 810, an aperture stop 800, a second lens element 820, a third lens element 830, a fourth lens element 840, a fifth lens element 850, a sixth lens element 860, a stop 801, an IR-cut filter 870 and an image surface 880, wherein an axial air gap is arranged between every two adjacent lens elements.

The first lens element 810 with positive refractive power has an object-side surface 811 being convex in a paraxial region thereof and an image-side surface 812 being convex in a paraxial region thereof, which are both aspheric, and the first lens element 810 is made of plastic material.

The second lens element 820 with negative refractive power has an object-side surface 821 being concave in a paraxial region thereof and an image-side surface 822 being concave in a paraxial region thereof, which are both aspheric, and the second lens element 820 is made of plastic material.

The third lens element 830 with positive refractive power has an object-side surface 831 being convex in a paraxial region thereof and an image-side surface 832 being concave in a paraxial region thereof, which are both aspheric, and the third lens element 830 is made of plastic material.

The fourth lens element 840 with negative refractive power has an object-side surface 841 being concave in a paraxial region thereof and an image-side surface 842 being concave in a paraxial region thereof, which are both aspheric, and the fourth lens element 840 is made of plastic material.

The fifth lens element 850 with positive refractive power has an object-side surface 851 being convex in a paraxial region thereof and an image-side surface 852 being concave in a paraxial region thereof, which are both aspheric, and the fifth lens element 850 is made of plastic material.

The sixth lens element 860 with negative refractive power has an object-side surface 861 being concave in a paraxial region thereof and an image-side surface 862 being convex in a paraxial region thereof, which are both aspheric, and the sixth lens element 860 is made of plastic material.

At least one of the first lens element 810, the second lens element 820, the third lens element 830, the fourth lens element 840, the fifth lens element 850, and the sixth lens element 860 has at least one inflection point.

The IR-cut filter 870 is made of glass, and will not affect the focal length of the image capturing lens system. The image sensor 890 is disposed on or near the image surface 880 of the image capturing lens system.

The detailed optical data of the eighth embodiment are shown in TABLE 21, and the aspheric surface data are shown in TABLE 22, wherein the units of the curvature radius, the thickness and the focal length are expressed in mm, and HFOV is half of the maximal field of view.

TABLE 21

(Embodiment 8)
f = 6.83 mm, Fno = 2.82, HFOV = 23.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.677 | ASP | 0.887 | Plastic | 1.544 | 55.9 | 2.86 |
| 2 | | −17.543 | ASP | −0.087 | | | | |
| 3 | Ape. Stop | Plano | | 0.137 | | | | |
| 4 | Lens 2 | −47.245 | ASP | 0.300 | Plastic | 1.639 | 23.5 | −4.56 |
| 5 | | 3.114 | ASP | 0.335 | | | | |
| 6 | Lens 3 | 7.035 | ASP | 0.402 | Plastic | 1.639 | 23.5 | 31.92 |
| 7 | | 10.501 | ASP | 0.169 | | | | |
| 8 | Lens 4 | −45.017 | ASP | 0.340 | Plastic | 1.544 | 55.9 | −7.59 |
| 9 | | 4.558 | ASP | 0.371 | | | | |
| 10 | Lens 5 | 7.345 | ASP | 0.400 | Plastic | 1.639 | 23.5 | 17.30 |
| 11 | | 21.428 | ASP | 1.521 | | | | |
| 12 | Lens 6 | −2.704 | ASP | 0.499 | Plastic | 1.544 | 55.9 | −8.63 |
| 13 | | −6.797 | ASP | −0.200 | | | | |
| 14 | Stop | Plano | | 0.500 | | | | |
| 15 | IR-cut filter | Plano | | 0.210 | Glass | 1.517 | 64.2 | — |
| 16 | | Plano | | 0.413 | | | | |
| 17 | Image Surface | Plano | | — | | | | |

* Reference wavelength is d-line 587.6 nm
* The effective radius of Surface 14 is 2.54 mm

TABLE 22

Aspheric Coefficients

| Surface # | 1 | 2 | 4 | 5 | 6 | 7 |
|---|---|---|---|---|---|---|
| k = | −5.6248E+00 | 1.0013E+01 | 6.9603E+01 | 7.1917E+00 | −2.4360E+01 | 8.9690E+01 |
| A4 = | 1.4450E−01 | −1.1902E−01 | −1.5478E−01 | −1.3207E−01 | −1.3235E−01 | −1.8991E−01 |
| A6 = | −9.0903E−02 | 3.4401E−01 | 5.3452E−01 | 3.6570E−01 | 1.9876E−01 | 3.2715E−01 |
| A8 = | 6.3899E−02 | −5.1746E−01 | −7.5153E−01 | −3.7892E−01 | −2.0307E−01 | −5.1146E−01 |
| A10 = | −3.3089E−02 | 4.0165E−01 | 6.1750E−01 | 2.3795E−01 | 1.4762E−02 | −6.1641E−02 |
| A12 = | 5.2355E−03 | −1.6314E−01 | −2.6560E−01 | 1.0689E−01 | 7.6958E−04 | 2.3724E−01 |
| A14 = | −1.0086E−03 | 2.6794E−02 | 4.7083E−02 | −1.3551E−01 | −2.1530E−02 | −1.3563E−01 |

| Surface # | 8 | 9 | 10 | 11 | 12 | 13 |
|---|---|---|---|---|---|---|
| k = | 1.5391E+01 | −8.3513E+00 | 1.4261E+01 | 9.0000E+01 | 1.6777E−01 | −1.9065E+01 |
| A4 = | −1.9072E−01 | −1.1131E−01 | −1.3824E−01 | −8.6454E−02 | −1.0442E−01 | −1.2712E−01 |
| A6 = | 4.8150E−01 | 4.1094E−01 | 1.6932E−01 | 9.1772E−02 | 1.0696E−01 | 9.0677E−02 |
| A8 = | −5.5515E−01 | −5.5591E−01 | −9.5185E−02 | −5.6137E−02 | −6.1209E−02 | −4.0454E−02 |
| A10 = | 2.8092E−01 | 4.0306E−01 | 2.6501E−02 | 3.3502E−02 | 1.9175E−02 | 9.7446E−03 |
| A12 = | 3.7067E−02 | −1.5261E−01 | −2.7971E−03 | −1.5087E−02 | −2.9573E−03 | −1.1960E−03 |
| A14 = | −4.9472E−02 | 2.5400E−02 | −2.9446E−04 | 3.5445E−03 | 1.9328E−04 | 4.7399E−05 |
| A16 = | | | | −3.3490E−04 | −2.3601E−06 | 2.2272E−06 |

In the 8th embodiment, the equation of the aspheric surface profiles of the aforementioned lens elements is the same as the equation of the 1st embodiment. Also, the definitions of these parameters shown in Table 23 below are the same as those stated in the 1st embodiment with corresponding values for the 8th embodiment, so an explanation in this regard will not be provided again.

Moreover, these parameters can be calculated from Table 21 and Table 22 and satisfy the conditions stated in Table 23.

TABLE 23

$8^{th}$ Embodiment

| | | | |
|---|---|---|---|
| f [mm] | 6.83 | (f/R11) + (f/R12) | −3.53 |
| Fno | 2.82 | f4/|f3| | −0.24 |
| HFOV [deg.] | 23.0 | f/f4 | −0.90 |
| Nmax | 1.639 | T56/(ΣAT − T56) | 1.64 |
| (V2 + V3 + V5)/V4 | 1.26 | tan(2 * HFOV) | 1.03 |
| CT4/CT5 | 0.85 | SAG62/CT6 | −2.09 |
| T56/CT5 | 3.80 | SD/TD | 0.85 |
| f/R1 | 4.07 | BL/TD | 0.18 |
| R4/R3 | −0.07 | TL [mm] | 6.20 |

9th Embodiment

Figure 9A:
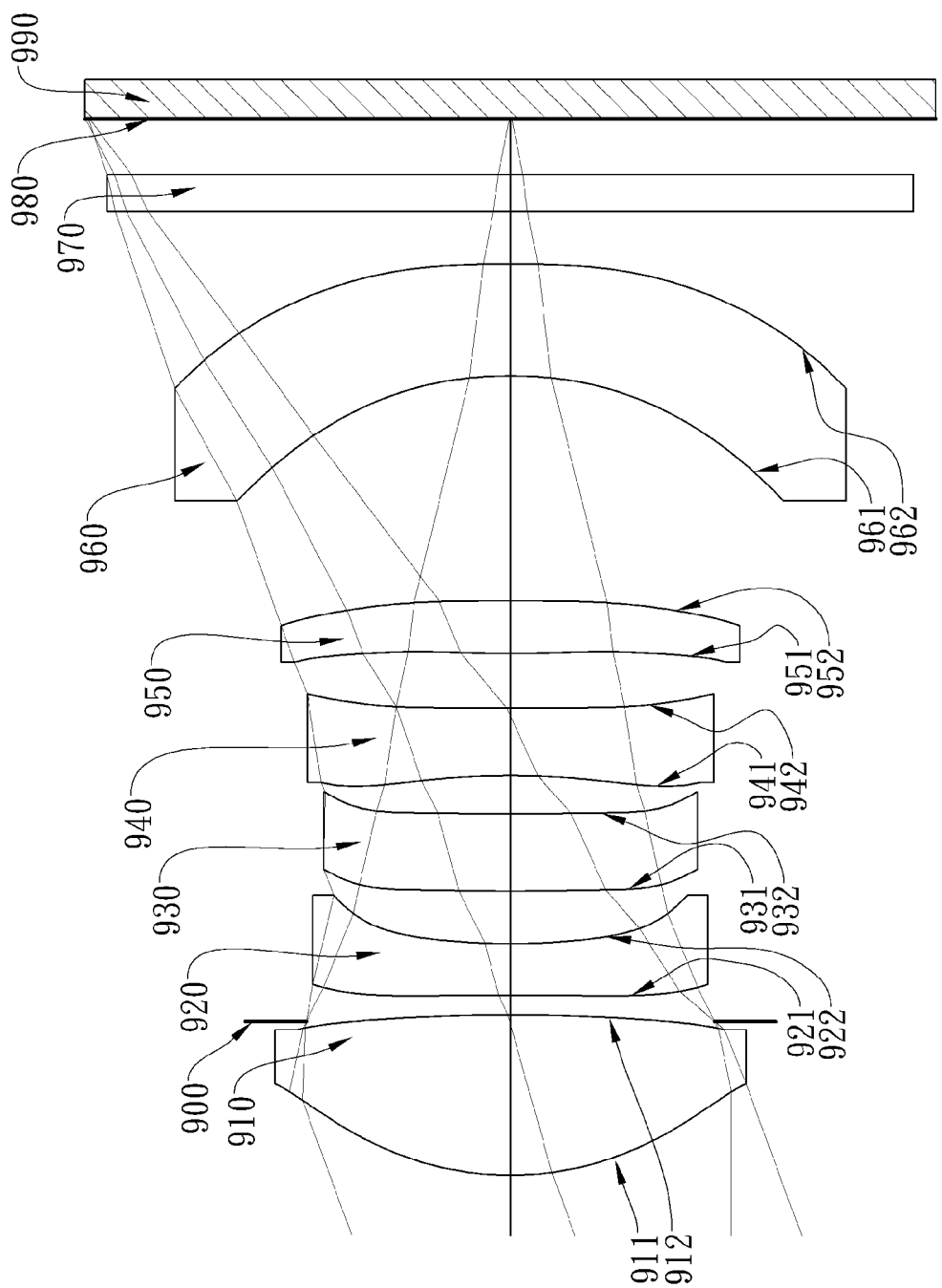
FIG. 9A is a schematic view of an image capturing apparatus according to the 9th embodiment of the present disclosure.
Figure 9B:
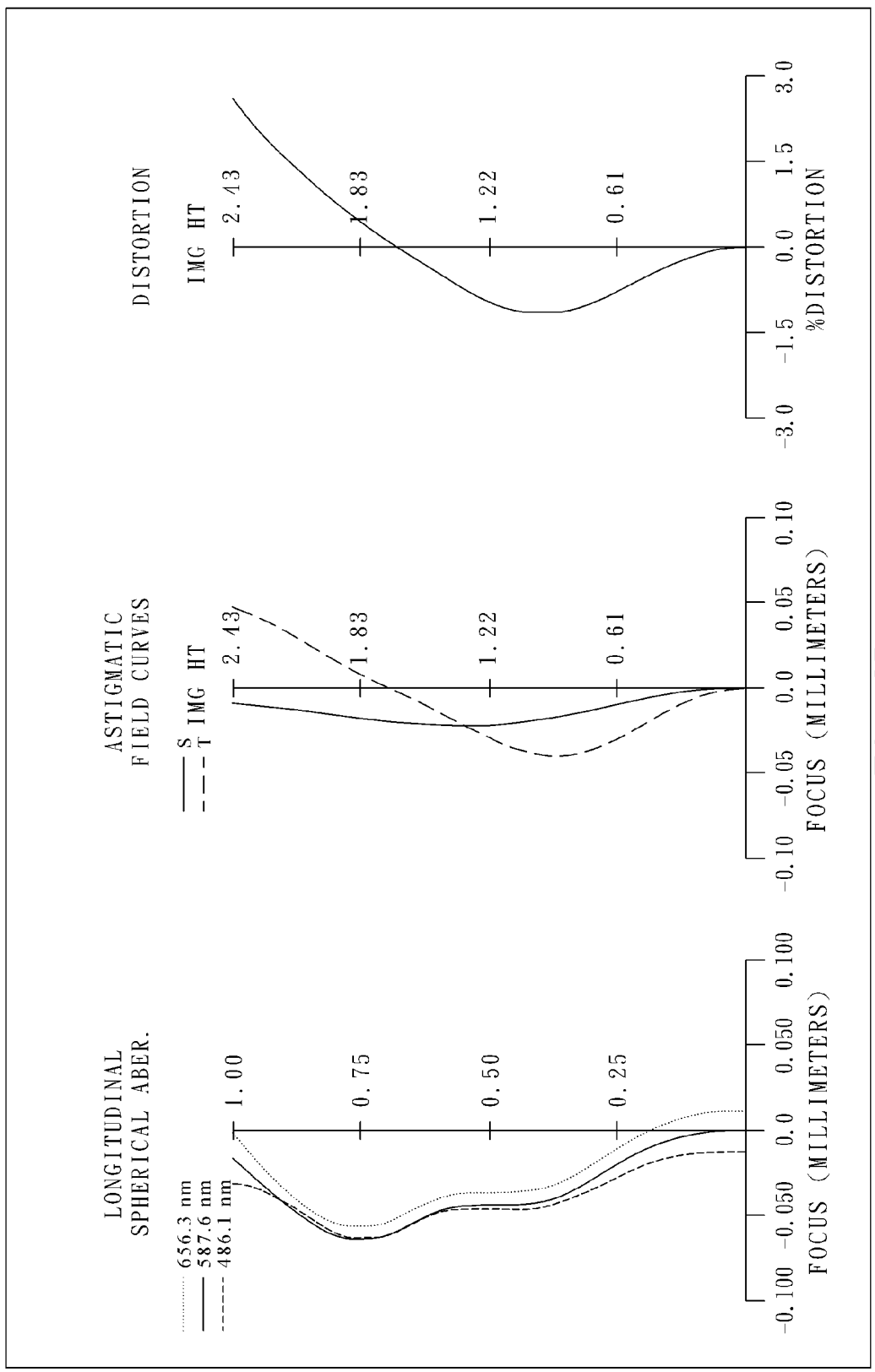
FIG. 9B shows longitudinal spherical aberration curves, astigmatic field curves and a distortion curve of the image capturing apparatus according to the 9th embodiment.

FIG. 9A is a schematic view of an image capturing apparatus according to the 9th embodiment of the present disclosure. FIG. 9B shows, in order from left to right, longitudinal spherical aberration curves, astigmatic field curves and a distortion curve of the image capturing apparatus according to the 9th embodiment.

In FIG. 9A, the image capturing apparatus includes an image capturing lens system (not otherwise herein labeled) of the present disclosure and an image sensor 990. The image capturing lens system includes, in order from an object side to an image side, a first lens element 910, an aperture stop 900, a second lens element 920, a third lens element 930, a fourth lens element 940, a fifth lens element 950, a sixth lens element 960, an IR-cut filter 970 and an image surface 980, wherein an axial air gap is arranged between every two adjacent lens elements.

The first lens element 910 with positive refractive power has an object-side surface 911 being convex in a paraxial region thereof and an image-side surface 912 being convex in a paraxial region thereof, which are both aspheric, and the first lens element 910 is made of glass material.

The second lens element 920 with negative refractive power has an object-side surface 921 being convex in a paraxial region thereof and an image-side surface 922 being concave in a paraxial region thereof, which are both aspheric, and the second lens element 920 is made of plastic material.

The third lens element 930 with positive refractive power has an object-side surface 931 being convex in a paraxial region thereof and an image-side surface 932 being concave in a paraxial region thereof, which are both aspheric, and the third lens element 930 is made of plastic material.

The fourth lens element 940 with negative refractive power has an object-side surface 941 being concave in a paraxial region thereof and an image-side surface 942 being concave in a paraxial region thereof, which are both aspheric, and the fourth lens element 940 is made of plastic material.

The fifth lens element 950 with positive refractive power has an object-side surface 951 being convex in a paraxial region thereof and an image-side surface 952 being convex in a paraxial region thereof, which are both aspheric, and the fifth lens element 950 is made of plastic material.

The sixth lens element 960 with negative refractive power has an object-side surface 961 being concave in a paraxial region thereof and an image-side surface 962 being convex in a paraxial region thereof, which are both aspheric, and the sixth lens element 960 is made of plastic material.

At least one of the first lens element 910, the second lens element 920, the third lens element 930, the fourth lens element 940, the fifth lens element 950, and the sixth lens element 960 has at least one inflection point.

The IR-cut filter 970 is made of glass, and will not affect the focal length of the image capturing lens system. The image sensor 990 is disposed on or near the image surface 980 of the image capturing lens system.

The detailed optical data of the ninth embodiment are shown in TABLE 24, and the aspheric surface data are shown in TABLE 25, wherein the units of the curvature radius, the thickness and the focal length are expressed in mm, and HFOV is half of the maximal field of view.

TABLE 24

(Embodiment 9)
f = 6.58 mm, Fno = 2.60, HFOV = 20.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.739 | ASP | 0.918 | Glass | 1.539 | 62.5 | 3.00 |
| 2 | | −18.781 | ASP | −0.036 | | | | |
| 3 | Ape. Stop | Plano | | 0.149 | | | | |
| 4 | Lens 2 | 234.391 | ASP | 0.295 | Plastic | 1.639 | 23.5 | −5.71 |
| 5 | | 3.589 | ASP | 0.302 | | | | |
| 6 | Lens 3 | 10.249 | ASP | 0.442 | Plastic | 1.639 | 23.5 | 544.65 |
| 7 | | 10.382 | ASP | 0.219 | | | | |
| 8 | Lens 4 | −5.118 | ASP | 0.387 | Plastic | 1.544 | 55.9 | −7.66 |
| 9 | | 23.123 | ASP | 0.314 | | | | |
| 10 | Lens 5 | 7.149 | ASP | 0.301 | Plastic | 1.639 | 23.5 | 10.77 |
| 11 | | −179.639 | ASP | 1.289 | | | | |
| 12 | Lens 6 | −2.432 | ASP | 0.642 | Plastic | 1.544 | 55.9 | −6.36 |
| 13 | | −8.959 | ASP | 0.300 | | | | |
| 14 | IR-cut filter | Plano | | 0.210 | Glass | 1.517 | 64.2 | — |
| 15 | | Plano | | 0.323 | | | | |
| 16 | Image Surface | Plano | | — | | | | |

* Reference wavelength is d-line 587.6 nm

TABLE 25

Aspheric Coefficients

| Surface # | 1 | 2 | 4 | 5 | 6 | 7 |
|---|---|---|---|---|---|---|
| k = | −6.4689E+00 | 5.2957E+01 | 9.0000E+01 | 9.0663E+00 | −4.6330E+01 | 8.5367E+01 |
| A4 = | 1.4124E−01 | −1.1912E−01 | −1.4845E−01 | −1.1876E−01 | −1.3515E−01 | −1.8593E−01 |
| A6 = | −9.1640E−02 | 3.4697E−01 | 5.3496E−01 | 3.6021E−01 | 1.9924E−01 | 3.2125E−01 |
| A8 = | 6.3731E−02 | −5.1104E−01 | −7.6093E−01 | −3.7741E−01 | −1.9814E−02 | −1.5536E−01 |
| A10 = | −3.0646E−02 | 4.0355E−01 | 6.1442E−01 | 2.3446E−01 | 1.7527E−02 | −6.2209E−02 |
| A12 = | 6.2674E−03 | −1.6736E−01 | −2.5585E−01 | 1.0639E−01 | 1.5898E−03 | 2.3861E−01 |
| A14 = | −7.0064E−04 | 2.8294E−02 | 4.2306E−02 | −1.2887E−01 | −1.9453E−02 | −1.3319E−01 |

| Surface # | 8 | 9 | 10 | 11 | 12 | 13 |
|---|---|---|---|---|---|---|
| k = | −6.3032E+01 | 3.7320E+01 | 6.2590E+00 | −9.0000E+01 | 1.6355E−01 | −7.8883E+00 |
| A4 = | −1.8080E−01 | −1.0575E−01 | −1.8673E−01 | −1.2389E−01 | −1.0626E−01 | −1.3464E−01 |
| A6 = | 4.8702E−01 | 4.1826E−01 | 1.7291E−01 | 9.8959E−02 | 1.0614E−01 | 9.2246E−02 |
| A8 = | −5.4983E−01 | −5.5918E−01 | −9.2537E−02 | −5.8680E−02 | −6.1250E−02 | −4.0290E−02 |
| A10 = | 2.7974E−01 | 4.0156E−01 | 2.6479E−02 | 3.3181E−02 | 1.9179E−02 | 9.7396E−03 |
| A12 = | 3.2962E−02 | −1.5297E−01 | −3.3038E−03 | −1.4979E−02 | −2.9589E−03 | −1.2013E−03 |
| A14 = | −5.3521E−02 | 2.4117E−02 | −9.3375E−04 | 3.5135E−03 | 1.9333E−04 | 4.7189E−05 |
| A16 = | | | | −3.9033E−04 | −2.0020E−06 | 2.1946E−06 |

In the 9th embodiment, the equation of the aspheric surface profiles of the aforementioned lens elements is the same as the equation of the 1st embodiment. Also, the definitions of these parameters shown in Table 26 below are the same as those stated in the 1st embodiment with corresponding values for the 9th embodiment, so an explanation in this regard will not be provided again.

Moreover, these parameters can be calculated from Table 24 and Table 25 and satisfy the conditions stated in Table 26.

TABLE 26

$9^{th}$ Embodiment

| f [mm] | 6.58 | (f/R11) + (f/R12) | −3.44 |
|---|---|---|---|
| Fno | 2.60 | f4/\|f3\| | −0.01 |
| HFOV [deg.] | 20.0 | f/f4 | −0.86 |
| Nmax | 1.639 | T56/(ΣAT − T56) | 1.36 |
| (V2 + V3 + V5)/V4 | 1.26 | tan(2 * HFOV) | 0.84 |
| CT4/CT5 | 1.29 | SAG62/CT6 | −1.11 |
| T56/CT5 | 4.28 | SD/TD | 0.83 |

TABLE 26-continued $9^{th}$ Embodiment

| f/R1 | 3.78 | BL/TD | 0.16 |
|---|---|---|---|
| R4/R3 | 0.02 | TL [mm] | 6.05 |

The foregoing description, for purpose of explanation, has been described with reference to specific embodiments. It is to be noted that TABLES 1-26 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens system, comprising, in order from an object side to an image side:
   a first lens element with positive refractive power having a convex object-side surface;
   a second lens element with negative refractive power;
   a third lens element having an object-side surface and an image-side surface which are both aspheric;
   a fourth lens element with negative refractive power having an object-side surface and an image-side surface which are both aspheric;
   a fifth lens element having an object-side surface and an image-side surface which are both aspheric; and
   a sixth lens element having a concave object-side surface and a convex image-side surface which are both aspheric;
   wherein the image capturing lens system has a total of six lens elements and an axial air gap is arranged between every two adjacent lens elements among the first lens element, the second lens element, the third lens element, the fourth lens element, the fifth lens element and the sixth lens element;
   wherein an axial distance between the fifth lens element and the sixth lens element is T56, a sum of axial air gaps between every two adjacent lens elements is ΣAT, a focal length of the fourth lens element is f4, a focal length of the third lens element is f3, a focal length of the image capturing lens system is f, a curvature radius of the object-side surface of the first lens element is R1, an axial distance between the image-side surface of the sixth lens element and an image surface is BL, an axial distance between the object-side surface of the first lens element and the image-side surface of the sixth lens element is TD, a central thickness of the fourth lens element is CT4, a central thickness of the fifth lens element is CT5, and the following conditions are satisfied:

$0.30 < T56/(\Sigma AT - T56)$;

$-4.0 < f4/|f3| < 0$;

$3.30 < f/R1 < 9.50$;

$0 < BL/TD < 0.70$; and $CT4/CT5 < 3.0$.

2. The image capturing lens system of claim 1, wherein the sixth lens element has negative refractive power.

3. The image capturing lens system of claim 1, wherein the fifth lens element has positive refractive power.

4. The image capturing lens system of claim 1, wherein the object-side surface of the fifth lens element is convex.

5. The image capturing lens system of claim 1, wherein at least one of the first lens element, the second lens element, the third lens element, the fourth lens element, the fifth lens element and the sixth lens element has at least one inflection point, a maximum refractive index among the refractive indices of the first lens element, the second lens element, the third lens element, the fourth lens element, the fifth lens element, and the sixth lens element is Nmax, and the following condition is satisfied:

$Nmax < 1.70$.

6. The image capturing lens system of claim 5, wherein the object-side surface of the fourth lens element is concave.

7. The image capturing lens system of claim 5, wherein the image-side surface of the fourth lens element is concave.

8. The image capturing lens system of claim 5, wherein the third lens element has positive refractive power.

9. The image capturing lens system of claim 1, wherein an axial distance between a stop and the image-side surface of the sixth lens element is SD, the axial distance between the object-side surface of the first lens element and the image-side surface of the sixth lens element is TD, and the following condition is satisfied: $0.70 < SD/TD < 1.10$.

10. The image capturing lens system of claim 9, wherein a focal length of the first lens element is f1, a focal length of the second lens element is f2, the focal length of the fourth lens element is f4, a focal length of the sixth lens element is f6, the focal length of the third lens element is f3, a focal length of the fifth lens element is f5, and the following conditions are satisfied:

$|f1| < |f2| < |f4| < |f3|$;

$|f1| < |f2| < |f4| < |f5|$;

$|f1| < |f2| < |f6| < |f3|$; and $|f1| < |f2| < |f6| < |f5|$.

11. The image capturing lens system of claim 9, wherein a curvature radius of an image-side surface of the second lens element is R4, a curvature radius of an object-side surface of the second lens element is R3, and the following condition is satisfied:

$-0.20 < R4/R3 < 0.40$.

12. The image capturing lens system of claim 1, wherein the focal length of the fourth lens element is f4, the focal length of the third lens element is f3, and the following condition is satisfied:

$-1.5 < f4/|f3| < 0$.

13. The image capturing lens system of claim 12, wherein the focal length of the fourth lens element is f4, the focal length of the third lens element is f3, and the following condition is satisfied:

$-0.65 < f4/|f3| < 0$.

14. The image capturing lens system of claim 12, wherein the axial distance between the image-side surface of the sixth lens element and the image surface is BL, the axial distance between the object-side surface of the first lens element and the image-side surface of the sixth lens element is TD, and the following condition is satisfied:

$0 < BL/TD < 0.30$.

15. The image capturing lens system of claim 1, wherein the focal length of the image capturing lens system is f, a curvature radius of the object-side surface of the sixth lens element is R11, a curvature radius of the image-side surface of the sixth lens element is R12, and the following condition is satisfied:

$-8.0 < (f/R11) + (f/R12) < -1.5$.

16. The image capturing lens system of claim 15, wherein the focal length of the image capturing lens system is f, the curvature radius of the object-side surface of the sixth lens element is R11, the curvature radius of the image-side surface of the sixth lens element is R12, and the following condition is satisfied:

$-8.0 < (f/R11) + (f/R12) < -2.5$.

17. The image capturing lens system of claim 1, wherein an Abbe number of the second lens element is V2, an Abbe number of the third lens element is V3, an Abbe number of the fifth lens element is V5, an Abbe number of the fourth lens element is V4, and the following condition is satisfied:

$0.70<(V2+V3+V5)/V4<1.50.$

18. The image capturing lens system of claim 1, wherein the axial distance between the fifth lens element and the sixth lens element is T56, the sum of the axial air gaps between every two adjacent lens elements is ΣAT, and the following condition is satisfied:

$0.85<T56/(ΣAT-T56).$

19. The image capturing lens system of claim 1, wherein a distance in parallel with an optical axis from an intersection of the image-side surface of the sixth lens element and the optical axis to a maximum effective radius position on the image-side surface of the sixth lens element is SAG62, a central thickness of the sixth lens element is CT6, and the following condition is satisfied:

$SAG62/CT6<-1.7.$

20. The image capturing lens system of claim 1, wherein an Abbe number of at least one of the lens elements with positive refractive power is less than 28.0.

21. The image capturing lens system of claim 1, wherein half of a maximal field of view of the image capturing lens system is HFOV, and the following condition is satisfied:

$\tan(2*HFOV)<1.20.$

22. The image capturing lens system of claim 1, wherein an axial distance between the third lens element and the fourth lens element is T34, an axial distance between the fourth lens element and the fifth lens element is T45, and the following condition is satisfied:

$T34<T45.$

23. The image capturing lens system of claim 1, wherein the central thickness of the fourth lens element is CT4, the central thickness of the fifth lens element is CT5, the axial distance between the fifth lens element and the sixth lens element is T56, and the following conditions are satisfied:

$CT4/CT5<1.7;$ $2.0<T56/CT5.$

24. The image capturing lens system of claim 1, wherein the focal length of the image capturing lens system is f, the focal length of the fourth lens element is f4, and the following condition is satisfied:

$-1.50<f/f4<-0.30.$

25. The image capturing lens system of claim 1, wherein the first lens element, the second lens element, the third lens element, the fourth lens element, the fifth lens element and the sixth lens element are made of plastic material, an axial distance between the object-side surface of the first lens element and the image surface is TL, and the following condition is satisfied:

$TL<8.0$ mm.

26. An image capturing apparatus, comprising:
the image capturing lens system of claim 1; and
an image sensor.

27. An electronic device, comprising:
the image capturing apparatus of claim 26.

* * * * *